US012726246B2

(12) United States Patent
Hirzallah et al.

(10) Patent No.: US 12,726,246 B2
(45) Date of Patent: Sep. 1, 2026

(54) SIGNALING FOR AI/ML CAPABILITY SCORING FOR AIR INTERFACE APPLICATIONS

(71) Applicant: QUALCOMM Incorporated, San Diego, CA (US)

(72) Inventors: Mohammed Ali Mohammed Hirzallah, San Marcos, CA (US); Srinivas Yerramalli, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 18/662,965

(22) Filed: May 13, 2024

(65) Prior Publication Data

US 2025/0350332 A1 Nov. 13, 2025

(51) Int. Cl.
*H04B 7/06* (2006.01)
*H04B 17/391* (2015.01)

(52) U.S. Cl.
CPC ....... *H04B 7/0626* (2013.01); *H04B 17/3913* (2015.01)

(58) Field of Classification Search
CPC .......................... H04B 7/0626; H04B 17/3913
USPC .......................................................... 370/329
See application file for complete search history.

(56) References Cited

U.S. PATENT DOCUMENTS

2022/0271851 A1* 8/2022 Prasad ..................... G06N 3/09
2023/0379955 A1* 11/2023 Guzman ............... H04W 24/02
2024/0196187 A1* 6/2024 Kovács ................. H04W 8/005
2024/0259070 A1* 8/2024 Kadambar ........... H04B 7/0632
2024/0284210 A1* 8/2024 Ali ........................ H04W 24/08
2024/0349082 A1* 10/2024 Li ......................... H04W 24/02
2024/0406927 A1* 12/2024 Hirzallah ............. H04W 64/00
(Continued)

FOREIGN PATENT DOCUMENTS

EP 4686118 A2 * 1/2026 ........... H04B 7/0626
WO WO-2024156460 A1 * 8/2024 ............. G06N 20/00
(Continued)

OTHER PUBLICATIONS

3GPP TR 38.843: "3rd Generation Partnership Project, Technical Specification Group Radio Access Network, Study on Artificial Intelligence (AI)/Machine Learning (ML) for NR Air Interface (Release 18)", 3GPP TR 38.843 V18.0.0, Dec. 2023, pp. 1-186, Sections 6.2, 6.2.1-6.2.2.8, 6.3, 6.3.1-6.3.2.5.

*Primary Examiner* — Anthony Mejia
(74) *Attorney, Agent, or Firm* — Procopio, Cory, Hargreaves & Savitch LLP/Qualcomm

(57) ABSTRACT

A method for wireless communication at a first wireless device and related apparatus are provided. In the method, the first wireless device communicates, with a second wireless device, one or more of a first indicator and a second indicator. The first indicator may include a target performance for a performance criterion associated with a functionality of the second wireless device, and the second indicator may include an expected performance for the performance criterion associated with the functionality. The first wireless device further measures the performance based on the functionality; and provides, for the second wireless device, feedback information indicating the measured performance associated with the functionality.

20 Claims, 14 Drawing Sheets

(56) References Cited

U.S. PATENT DOCUMENTS

| | | | | |
|---|---|---|---|---|
| 2025/0015949 | A1* | 1/2025 | Henry | H04L 5/0048 |
| 2025/0293741 | A1* | 9/2025 | Ibrahim | H04B 17/373 |
| 2025/0293942 | A1* | 9/2025 | Li | H04L 41/147 |
| 2025/0330391 | A1* | 10/2025 | Tian | G06N 20/00 |
| 2026/0066956 | A1* | 3/2026 | Yang | H04B 7/0417 |

FOREIGN PATENT DOCUMENTS

| | | | | |
|---|---|---|---|---|
| WO | WO-2024173223 | A1 * | 8/2024 | G06N 3/08 |
| WO | WO-2025127261 | A1 * | 6/2025 | H04B 7/0626 |

* cited by examiner

100
Service Management and Orchestration (SMO) Framework
Non-Real Time RAN Intelligent Controller (RIC)
115
105
O1
O2
E2
A1
O-eNB
111
O-Cloud
190
Near-Real Time RAN Intelligent Controller (RIC)
125
CU
110
E2
F1
Midhaul link
Fronthaul link
DU
130
RU
140
UE
104
Access link
SPS
170
182
184
150
154
158
Backhaul Link
120
Core Network
AMF 161
SMF 162
UPF 163
UDM 164
GMLC 165
LMF 166
Set of Location Servers 168
Performance Feedback Component
199
198
BS 102
CU
DU
RU

SIGNALING FOR AI/ML CAPABILITY SCORING FOR AIR INTERFACE APPLICATIONS

TECHNICAL FIELD

The present disclosure relates generally to communication systems and, more particularly, to the signaling mechanisms for capability feedback or rating for air interface applications in wireless communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first wireless device. The apparatus may include at least one memory and at least one processor coupled to the at least one memory. Based at least in part on information stored in the at least one memory, the at least one processor, individually or in any combination, may be configured to cause the first wireless device to communicate, with a second wireless device, one or more of a first indicator and a second indicator. The first indicator may include a target performance for a performance criterion associated with a functionality of the second wireless device, and the second indicator may include an expected performance for the performance criterion associated with the functionality. The at least one processor, individually or in any combination, may be further configured to cause the first wireless device to measure a performance based on the functionality; and provide, for the second wireless device, feedback information indicating a measured performance associated with the functionality.

In an aspect of the disclosure, a method, a computer-readable medium, and an apparatus are provided for wireless communication at a target wireless device. The apparatus may include at least one memory and at least one processor coupled to the at least one memory. Based at least in part on information stored in the at least one memory, the at least one processor, individually or in any combination, may be configured to cause the target wireless device to communicate, with a first wireless device, one or more of a first indicator and a second indicator, the first indicator including a target performance for a performance criterion associated with a functionality of the target wireless device, and the second indicator including an expected performance for the performance criterion associated with the functionality; transmit wireless transmissions based on the functionality; and receive feedback information indicating a measured performance associated with the functionality that is measured by the first wireless device.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
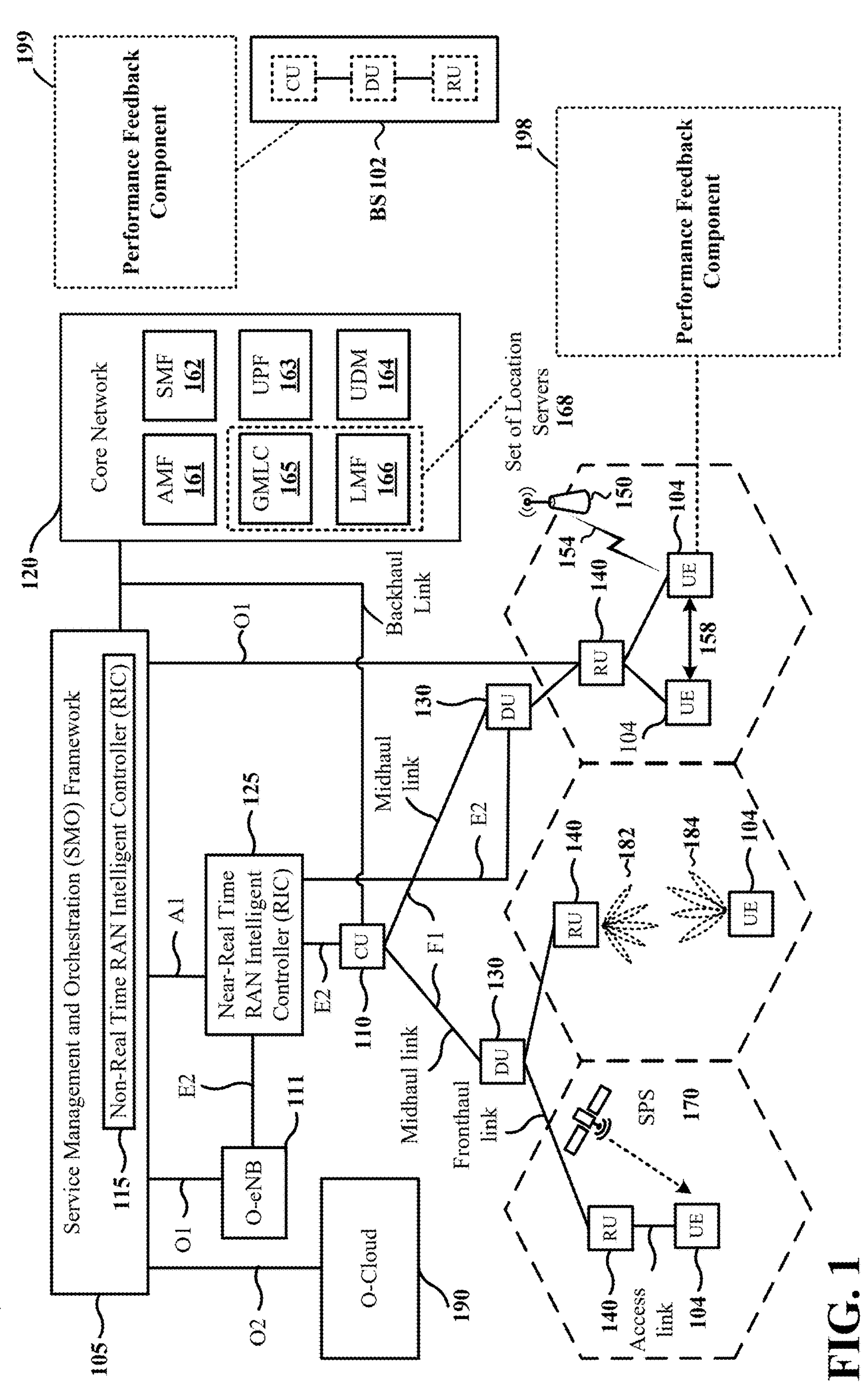
FIG. 1 is a diagram illustrating an example of a wireless communication system and an access network.

In wireless communication, user equipment (UE) or network entities may employ various computer-implemented models, such as artificial intelligence and/or machine learning (AI/ML) models, to predict the most suitable transmission settings, thereby enhancing network efficiency and reliability. For example, AI/ML models may be employed for applications such as beam prediction and channel station information (CSI) feedback compression and prediction. Despite offline testing, the actual performance of the models (e.g., AI/ML models) in diverse real-world scenarios may not align with preliminary test results. Additionally, the performance of these models may change or drift over time after the deployments (e.g., post-deployment). Hence, there is a need for mechanisms that allow for real-time ongoing evaluation and feedback on the capabilities of these models (e.g., AI/ML models) in wireless networks to ensure their consistent performance post-deployment.

Various aspects relate generally to wireless communication. Some aspects more specifically relate to the signaling mechanism for capability feedback or rating for air interface applications in wireless communication. In some examples, a first wireless device may communicate, with a second wireless device, one or more of a first indicator and a second indicator. The first indicator may include the target performance for the performance criterion associated with the functionality of the second wireless device, and the second indicator may include the expected performance for the performance criterion associated with the functionality. The first wireless device may further measure the performance based on the functionality; and provide, for the second wireless device, feedback information indicating a measured performance associated with the functionality. In some examples, the functionality may be associated with an AI/ML functionality or an AI/ML model. In some examples, the performance criterion associated with the functionality may include one or more of: the accuracy of the functionality, the loss value of the functionality, the throughput gain associated with the functionality, or the latency associated with the functionality.

Particular aspects of the subject matter described in this disclosure can be implemented to realize one or more of the following potential advantages. In some examples, by providing signaling mechanisms for feedback and rating of computer-implemented models, such as AI/ML models, the described techniques allow for continuous post-deployment validation of these models, thereby ensuring the models remain effective and adapt to varying real-world scenarios and performance changes or drifts over time. In some aspects, by allowing adaptive refinements to a model or the switch between different models based on real-world performance feedback, the described techniques ensure that the best-performing model is in use without disrupting the ongoing operations of the UE or the network entity. In some aspects, by aggregating performance feedback across multiple wireless devices, the described techniques enable more precise adjustments and improvements to the model.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a performance feedback component 198. The performance feedback component 198 may be configured to communicate, with a second wireless device, one or more of a first indicator and a second indicator, the first indicator including a target performance for a performance criterion associated with a functionality of the second wireless device, and the second indicator including an expected performance for the performance criterion associated with the functionality; measure a performance based on the functionality; and provide, for the second wireless device, feedback information indicating a measured performance associated with the functionality. In certain aspects, the base station 102 may include a performance feedback component 199. The performance feedback component 199 may be configured to communicate, with a first wireless device, one or more of a first indicator and a second indicator, the first indicator including a target performance for a performance criterion associated with a functionality of the target wireless device, and the second indicator including an expected performance for the performance criterion associated with the functionality; transmit wireless transmissions based on the functionality; and receive feedback information indicating a measured performance associated with the functionality that is measured by the first wireless device. Although the following description may be focused on 5G NR, the concepts described herein may be applicable to other similar areas, such as LTE, LTE-A, CDMA, GSM, and other wireless technologies.

Figures 2A, 2B, 2C, 2D:
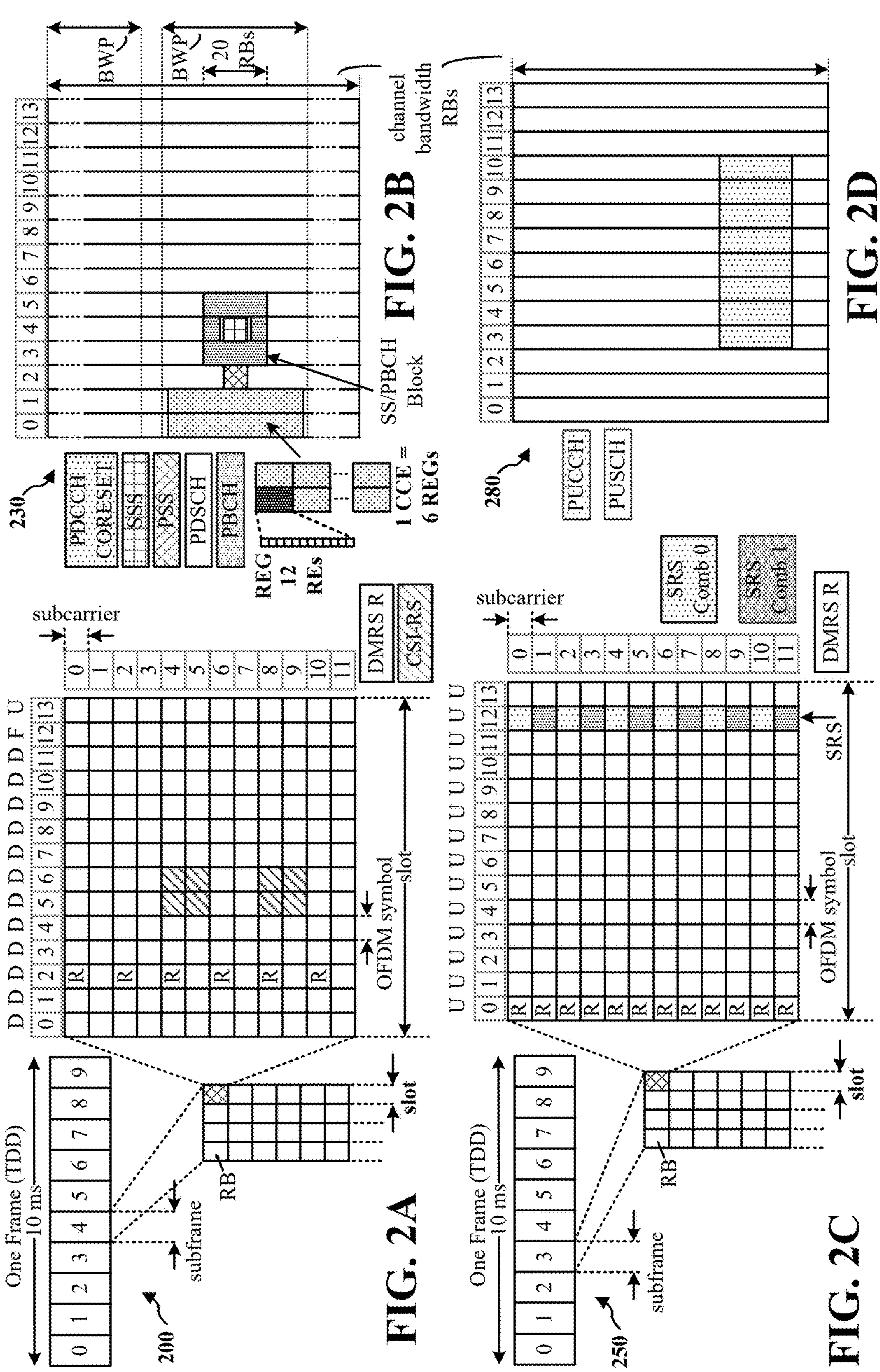
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 24 slots/subframe. The subcarrier spacing may be equal to $2^{\mu}*15$ kHz, where u is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
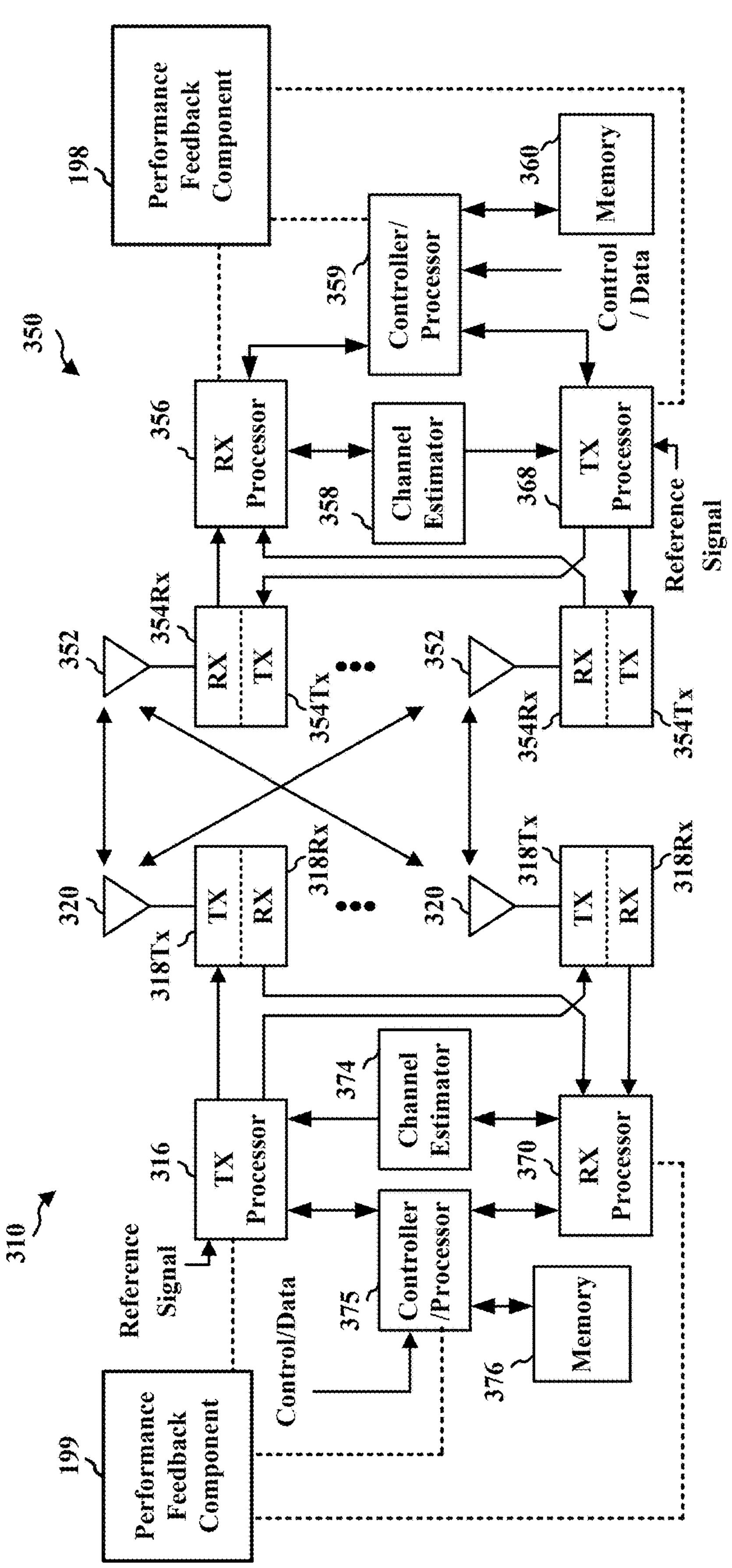
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the performance feedback component 198 of FIG. 1.

At least one of the TX processor 316, the RX processor 370, and the controller/processor 375 may be configured to perform aspects in connection with the performance feedback component 199 of FIG. 1.

Some aspects and techniques as described herein may be implemented, at least in part, using an artificial intelligence (AI) program, such as a program that includes a machine learning (ML) or artificial neural network (ANN) model. An example ML model may include mathematical representations or define computing capabilities for making inferences from input data based on patterns or relationships identified in the input data. As used herein, the term "inferences" can include one or more decisions, predictions, determinations, or values, which may represent outputs of the ML model. The computing capabilities may be defined in terms of certain parameters of the ML model, such as weights and biases. Weights may indicate relationships between certain input data and certain outputs of the ML model, and biases are offsets that may indicate a starting point for the outputs of the ML model. An example ML model operating on input data may start at an initial output based on the biases and then update its output based on a combination of the input data and the weights.

In some aspects, an ML model may be configured to provide computing capabilities for wireless communications. Such an ML model may be configured with weights and biases to perform predictions regarding a set of resources (e.g., Set-A beams) based on measurements of another set of resources (e.g., Set-B beams). Thus, during the operation of a device, the ML model may receive input data (such as measurements associated with the first set of resources (e.g., Set-B beam measurements) and make inferences (such as predictions for Set-A beams) based on the weights and biases. The ML model may be employed to assist in beam management or beam selection using a reduced set of measurements.

ML models may be deployed in one or more devices (for example, network entities and user equipment (UE)) and may be configured to enhance various aspects of a wireless communication system. For example, an ML model may be trained to identify patterns or relationships in data corresponding to a network, a device, an air interface, or the like. An ML model may support operational decisions relating to one or more aspects associated with wireless communications devices, networks, or services. For example, an ML model may be utilized for supporting or improving aspects such as signal coding/decoding, network routing, energy conservation, transceiver circuitry controls, frequency synchronization, timing synchronization, channel state estimation, channel equalization, channel state feedback, modulation, demodulation, device positioning, beamforming, load balancing, operations and management functions, security, etc.

ML models may be characterized in terms of types of learning that generate specific types of learned models that perform specific types of tasks. For example, different types of machine learning include supervised learning, unsupervised learning, semi-supervised learning, reinforcement learning, deep learning, etc. ML models may be used to perform different tasks, such as classification or regression, where classification refers to determining one or more discrete output values from a set of predefined output values, and regression refers to determining continuous values that are not bounded by predefined output values. Some example ML models configured for performing such tasks include ANNs such as convolutional neural networks (CNNs) and recurrent neural networks (RNNs), transformers, diffusion models, regression analysis models (such as statistical models), large language models (LLMs), decision tree learning (such as predictive models), support vector networks (SVMs), and probabilistic graphical models (such as a Bayesian network), etc.

The description herein illustrates, by way of some examples, how one or more tasks or problems in wireless communications may benefit from the application of one or more ML models for the prediction of one or more channel characteristics associated with a second set of resources using measurement of the aperiodic reference signal on a first set of resources based on a first mapping pattern. The first mapping pattern maps the first set of resources to the second set of resources, and the first mapping pattern and a second mapping pattern associated with an initial training meet one or more of a spatial domain consistency condition or a temporal domain consistency condition. To facilitate the discussion, an ML model configured using an ANN is used, but other types of ML models may be used instead of an ANN. Hence, unless expressly recited, subject matter regarding an ML model is not intended to be limited to an ANN solution. Unless otherwise specifically stated, terms such "AI/ML model," "ML model," "trained ML mode," "ANN," "model," "algorithm," or the like are intended to be interchangeable.

Figure 4:
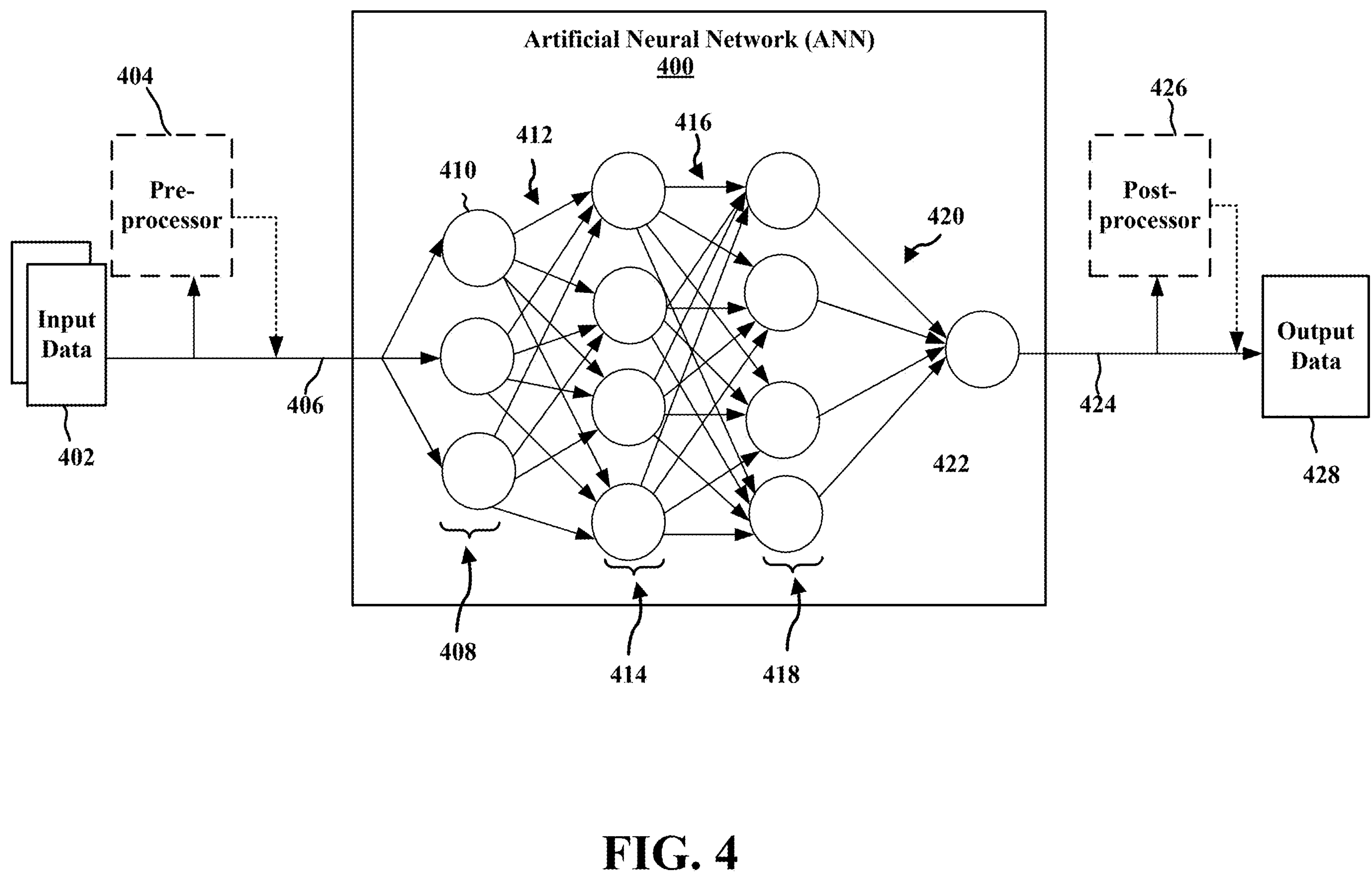
FIG. 4 is an illustrative block diagram of an example machine learning (ML) model represented by an artificial neural network (ANN), in accordance with various aspects of the present disclosure.

FIG. 4 is an illustrative block diagram of an example machine learning (ML) model represented by an artificial neural network (ANN) 400. ANN 400 may receive input data 406, which may include one or more bits of data A02, pre-processed data output from pre-processor 404 (optional), or some combination thereof. Here, data 402 may include training data, verification data, application-related data, or the like, based, for example, on the stage of deployment of ANN 400. Pre-processor 404 may be included within ANN 400 in some other implementations. Pre-processor 404 may, for example, process all or a portion of data 402, which may result in some of data 402 being changed, replaced, deleted, etc. In some implementations, pre-processor 404 may add additional data to data 402. In some implementations, the pre-processor 404 may be an ML model, such as an ANN. As an example, the input may include measurements performed on Set-B beams.

The ANN 400 includes at least one first layer 408 of artificial neurons 410 to process input data 406 and provide resulting first layer data via connections or "edges" such as edges 412 to at least a portion of at least one second layer 414. Second layer 414 processes data received via edges 412 and provides second layer output data via edges 416 to at least a portion of at least one third layer 418. Third layer 418 processes data received via edges 416 and provides third layer output data via edges 420 to at least a portion of a final layer 422, including one or more neurons to provide output data 424. All or part of output data 424 may be further processed in some manner by (optional) post-processor 426. Thus, in certain examples, ANN 400 may provide output data 428 that is based on output data 424, post-processed data output from post-processor 426, or some combination thereof. As an example, the output may include a set of resource (e.g., beam) predictions for Set-A beams. A base station or UE may then select a beam for use in transmission and/or reception based on the beam predictions for the Set-A beams output from the AI/ML model.

Post-processor 426 may be included within ANN 400 in some other implementations. Post-processor 426 may, for example, process all or a portion of output data 424, which may result in output data 428 being different, at least in part, from output data 424, as a result of data being changed, replaced, deleted, etc. In some implementations, post-processor 426 may be configured to add additional data to output data 424. In this example, second layer 414 and third layer 418 represent intermediate or hidden layers that may be arranged in a hierarchical or other like structure. Although not explicitly shown, there may be one or more further intermediate layers between the second layer 414 and the third layer 418. In some implementations, the post-processor 426 may be an ML model, such as an ANN.

The structure and training of artificial neurons 410 in the various layers may be tailored to the specific requirements of an application. Within a given layer, such as first layer 408, second layer 414, or third layer 418 of ANN 400, some or all of the neurons may be configured to process information provided to the layer and output corresponding transformed information from the layer. For example, transformed information from a layer may represent a weighted sum of the input information associated with or otherwise based on a non-linear activation function or other activation function used to "activate" the artificial neurons of the next layer. Artificial neurons in such a layer may be activated by or be responsive to parameters such as the previously described weights and biases of ANN 400. The weights and biases of ANN 400 may be adjusted during a training process or during operation of ANN 400. The weights of the various artificial neurons may control the strength of connections between layers or artificial neurons, while the biases may control the direction of connections between the layers or artificial neurons. An activation function may select or determine whether an artificial neuron transmits its output to the next layer or not in response to its received data.

Different activation functions may be used to model different types of non-linear relationships. By introducing non-linearity into an ML model, an activation function allows the configuration for the ML model to change in response to identifying or detecting complex patterns and relationships in the input data A06. Some non-exhaustive example activation functions include a sigmoid based activation function, a hyperbolic tangent (tanh) based activation function, a convolutional activation function, up-sampling, pooling, and a rectified linear unit (ReLU) based activation function.

Training of an ML model, such as ANN 400, may be conducted using training data. Training data may include one or more datasets that ANN 400 may use to identify patterns or relationships. Training data may represent various types of information, including written, visual, audio, environmental context, operational properties, etc. During training, the parameters (such as the weights and biases) of artificial neurons 410 may be changed, such as to minimize or otherwise reduce a loss function or a cost function. A training process may be repeated multiple times to fine-tune ANN 400 with each iteration.

Various ANN model structures are available for consideration. For example, in a feedforward ANN structure, each artificial neuron 410 in layer A14 receives information from the previous layer (such as one or more artificial neurons 410 in layer 408) and produces information for the next layer (such as one or more artificial neurons 410 in layer 418). In a convolutional ANN structure, some layers may be organized into filters that extract features from data, such as the training data or the input data. In a recurrent ANN structure, some layers may have connections that allow for the processing of data across time, such as for processing information having a temporal structure, such as time series data forecasting.

In an autoencoder ANN structure, compact representations of data may be processed and the model trained to predict or potentially reconstruct original data from a reduced set of features. An autoencoder ANN structure may be useful for tasks related to dimensionality reduction and data compression.

A generative adversarial ANN structure may include a generator ANN and a discriminator ANN that are trained to compete with each other. Generative-adversarial networks (GANs) are ANN structures that may be useful for tasks relating to generating synthetic data or improving the performance of other models.

A transformer ANN structure makes use of attention mechanisms that may enable the model to process input sequences in a parallel and efficient manner. An attention mechanism allows the model to focus on different parts of the input sequence at different times. Attention mechanisms may be implemented using a series of layers known as attention layers to compute weighted sums of input features based on a similarity between different elements of the input sequence. A transformer ANN structure may include a series of feedforward ANN layers whose configurations may change in response to identifying non-linear relationships between the input and output sequences, which may also be referred to as a process of "learning" by the ANN layers. The output of a transformer ANN structure may be obtained by applying a linear transformation to the output of a final attention layer. A transformer ANN structure may be of particular use for tasks that involve sequence modeling, or other like processing.

Another example type of ANN structure is a model with one or more invertible layers. Models of this type may be inverted or "unwrapped" to reveal the input data that was used to generate the output of a layer. Other example types of ANN model structures include fully connected neural networks (FCNNs) and long short-term memory (LSTM) networks.

ANN 400 or other ML models may be implemented in various types of processing circuits along with memory and applicable instructions therein. For example, general-purpose hardware circuits, such as one or more central processing units (CPUs), one or more graphics processing units (GPUs), or suitable combinations thereof, may be employed to implement a model. In some implementations, one or more tensor processing units (TPUs), neural processing units (NPUs), or other special-purpose processors, field-programmable gate arrays (FPGAs), application-specific integrated circuits (ASICs), or the like may also be employed. In some implementations, the ML model may be implemented by an NPU or a TPU embedded in a system on chip (SoC) along with other components, such as one or more CPUs, GPUs, etc. A SoC includes several components manufactured on a shared semiconductor substrate. The NPU or TPU may be controlled by the one or more CPUs by configuring the ML model implemented by the NPU or TPU with weights and biases, providing certain training data to the ML model to configure the ML model, or providing input data to the ML model to obtain related inferences. The one or more CPUs may also receive the inferences and be configured to perform certain actions based on the inferences produced by the ML model. The actions performed by the one or more CPUs may include sending commands to other components of the SoC or components external to the SoC to perform certain actions. For example, the CPU may send commands to an RF transceiver based on the outputs or inferences obtained from an ML model to cause the RF transceiver to operate on a wireless network in accordance with the ML model.

In some examples, an ML model may be trained prior to, or at some point following, operation of the ML model, such as ANN 400, on input data. When training the ML model, information in the form of applicable training data may be gathered or otherwise created for use in training an ANN accordingly. For example, training data may be gathered or otherwise created regarding information associated with received/transmitted signal strengths, interference, and resource usage data, as well as any other relevant data that might be useful for training a model to address one or more problems or issues in a communication system. In certain instances, all or part of the training data may originate in a user equipment (UE) or other device in a wireless communication system, or one or more network entities, or aggregated from multiple sources (such as a UE and a network entity/entities, one or more other UEs, the Internet, or the like). For example, wireless network architectures, such as self-organizing networks (SON) or mobile drive test (MDT) networks, may be adapted to support the collection of data for ML model applications. In another example, training data may be generated or collected online, offline, or both online and offline by a UE, network entity, or other device(s), and all or part of such training data may be transferred or shared (in real or near-real time), such as through store and forward functions or the like.

Offline training may refer to creating and using a static training dataset, such as in a batched manner, whereas online training may refer to the real-time collection and use of training data. For example, an ML model at a network device (such as a UE) may be trained or fine-tuned using online or offline training. For offline training, data collection and training can occur in an offline manner at the network side (such as at a base station or other network entity) or at the UE side. For online training, the training of a UE-side ML model may be performed locally at the UE or by a server device (such as a server hosted by a UE vendor) in a real-time or near-real-time manner based on data provided to the server device from the UE. In certain instances, all or part of the training data may be shared within a wireless communication system or even shared (or obtained from) outside of the wireless communication system.

Once an ANN has been configured by setting parameters, including weights and biases, from training data, the ANN's performance may be evaluated. In some scenarios, evaluation/verification tests may use a validation dataset, which may include data not in the training data, to compare the model's performance to baseline or other benchmark information. The ANN configuration may be further refined, for example, by changing its architecture, retraining it on the data, or using different optimization techniques, etc.

As part of a training process, parameters affecting the functioning of the artificial neurons and layers may be adjusted. For example, backpropagation techniques may be used to train an ANN by iteratively adjusting weights or biases of certain artificial neurons associated with errors between a predicted output of the model and a desired output that may be known or otherwise deemed acceptable. Backpropagation may include a forward pass, a loss function, a backward pass, and a parameter update that may be performed in training iteration. The process may be repeated for a certain number of iterations for each set of training data until the weights of the artificial neurons/layers are adequately tuned.

Backpropagation techniques associated with a loss function may measure how well a model is able to predict a desired output for a given input. An optimization algorithm may be used during a training process to adjust weights and biases to reduce or minimize the loss function, which can improve the performance of the model. There are a variety of optimization algorithms that may be used along with backpropagation techniques or other training techniques. Some initial examples include a gradient descent based optimization algorithm and a stochastic gradient descent based optimization algorithm. A stochastic gradient descent technique may be used to adjust weights/biases in order to minimize or otherwise reduce a loss function. A mini-batch gradient descent technique, which is a variant of gradient descent, may involve updating weights/biases using a small batch of training data rather than the entire dataset. A momentum technique may accelerate an optimization process by adding a momentum term to update or otherwise affect certain weights/biases.

An adaptive learning rate technique may adjust the learning rate of an optimization algorithm associated with one or more characteristics of the training data. A batch normalization technique may be used to normalize inputs to a model in order to stabilize a training process and potentially improve the performance of the model. A "dropout" technique may be used to randomly drop out some of the artificial neurons from a model during a training process, for example, in order to reduce overfitting and potentially improve the generalization of the model. An "early stopping" technique may be used to stop an ongoing training process early, such as when a performance of the model using a validation dataset starts to degrade.

Another example technique includes data augmentation to generate additional training data by applying transformations to all or part of the training information. A transfer learning technique may be used which involves using a pre-trained model as a starting point for training a new model, which may be useful when training data is limited or when there are multiple tasks that are related to each other. A multi-task learning technique may be used which involves training a model to perform multiple tasks simultaneously to potentially improve the performance of the model on one or more of the tasks. Hyperparameters or the like may be input and applied during a training process in certain instances.

Another example technique that may be useful with regard to an ANN is a "pruning" technique. A pruning technique, which may be performed during a training process or after a model has been trained, involves the removal of unnecessary or less necessary, or possibly redundant features from a model. In certain instances, a pruning technique may reduce the complexity of a model or improve the efficiency of a model without undermining the intended performance of the model.

Pruning techniques may be particularly useful in the context of wireless communication, where the available resources (such as power and bandwidth) may be limited. Some example pruning techniques include a weight pruning technique, a neuron pruning technique, a layer pruning technique, a structural pruning technique, and a dynamic pruning technique. Pruning techniques may, for example, reduce the amount of data corresponding to a model that is transmitted or stored. Weight pruning techniques may involve removing some of the weights from a model. Neuron pruning techniques may involve removing some neurons from a model. Layer pruning techniques may involve removing some layers from a model. Structural pruning techniques may involve removing some connections between neurons in a model. Dynamic pruning techniques may involve adapting a pruning strategy of a model associated with one or more characteristics of the data or the environment. For example, in certain wireless communication devices, a dynamic pruning technique may more aggressively prune a model for use in a low-power or low-bandwidth environment and less aggressively prune the model for use in a high-power or high-bandwidth environment. In certain example implementations, pruning techniques may also be applied to training data, for example, to remove outliers. In some implementations, pre-processing techniques directed to all or part of a training dataset may improve model performance or promote faster convergence of a model. For example, training data may be pre-processed to change or remove unnecessary data, extraneous data, incorrect data, or otherwise identifiable data. Such pre-processed training data may, for example, lead to a reduction in potential overfitting or otherwise improve the performance of the trained model.

One or more of the example training techniques presented above may be employed as part of a training process. Some example training processes that may be used to train an ANN include supervised learning, unsupervised learning, semi-supervised learning, and reinforcement learning techniques. With supervised learning, a model is trained on a labeled training dataset, wherein the input data is accompanied by a correct or otherwise acceptable output. With unsupervised learning, a model is trained on an unlabeled training dataset, such that the model will learn to identify patterns and relationships in the data without the explicit guidance of a labeled training dataset. With semi-supervised learning, a model is trained using some combination of supervised and unsupervised learning processes, for example, when the amount of labeled data is somewhat limited. With reinforcement learning, a model may learn from interactions with its operation/environment, such as in the form of feedback akin to rewards or penalties. Reinforcement learning may be particularly beneficial when used to improve or attempt to optimize the behavior of a model deployed in a dynamically changing environment, such as a wireless communication network.

Distributed, shared, or collaborative learning techniques may be used for the training process. For example, techniques such as federated learning may be used to decentralize the training process and rely on multiple devices, network entities, or organizations for training various versions or copies of an ML model without relying on a centralized training mechanism. Federated learning may be particularly useful in scenarios where data is sensitive or subject to privacy constraints, or where it is impractical, inefficient, or expensive to centralize data. In the context of wireless communication, for example, federated learning may be used to improve performance by allowing an ANN to be trained on data collected from a wide range of devices and environments. For example, an ANN may be trained on data collected from a large number of wireless devices in a network, such as distributed wireless communication nodes, smartphones, or internet-of-things (IoT) devices, to improve the network's performance and efficiency. With federated learning, a user equipment (UE) or other device may receive a copy of all or part of a global or shared model and perform local training on the local model using locally available training data. The UE may provide updated information regarding the locally trained model to one or more other devices (such as a network entity or a server), where the updates from other-like devices (such as other UEs) may be aggregated and used to provide an update to the global or shared model. A federated learning process may be repeated iteratively until all or part of a model obtains a satisfactory level of performance. Federated learning may enable devices to protect the privacy and security of local data, while supporting collaboration regarding training and updating of all or part of a shared model.

In some implementations, one or more devices or services may support processes relating to an ML model's usage, maintenance, activation, reporting, or the like. In certain instances, all or part of a dataset or model may be shared across multiple devices to provide or otherwise augment or improve processing. In some examples, signaling mechanisms may be utilized at various nodes of wireless networks to signal the capabilities for performing specific functions related to ML models, support for specific ML models, capabilities for gathering, creating, and transmitting training data, or other ML related capabilities. ML models in wireless communication systems may, for example, be employed to support decisions or improve performance relating to wireless resource allocation or selection, wireless channel condition estimation, interference mitigation, beam management, positioning accuracy, energy savings, or modulation or coding schemes, etc. In some implementations, model deployment may occur jointly or separately at various network levels, such as a UE, a network entity such as a base station, or a disaggregated network entity such as a central unit (CU), a distributed unit (DU), a radio unit (RU), or the like.

Figure 5:
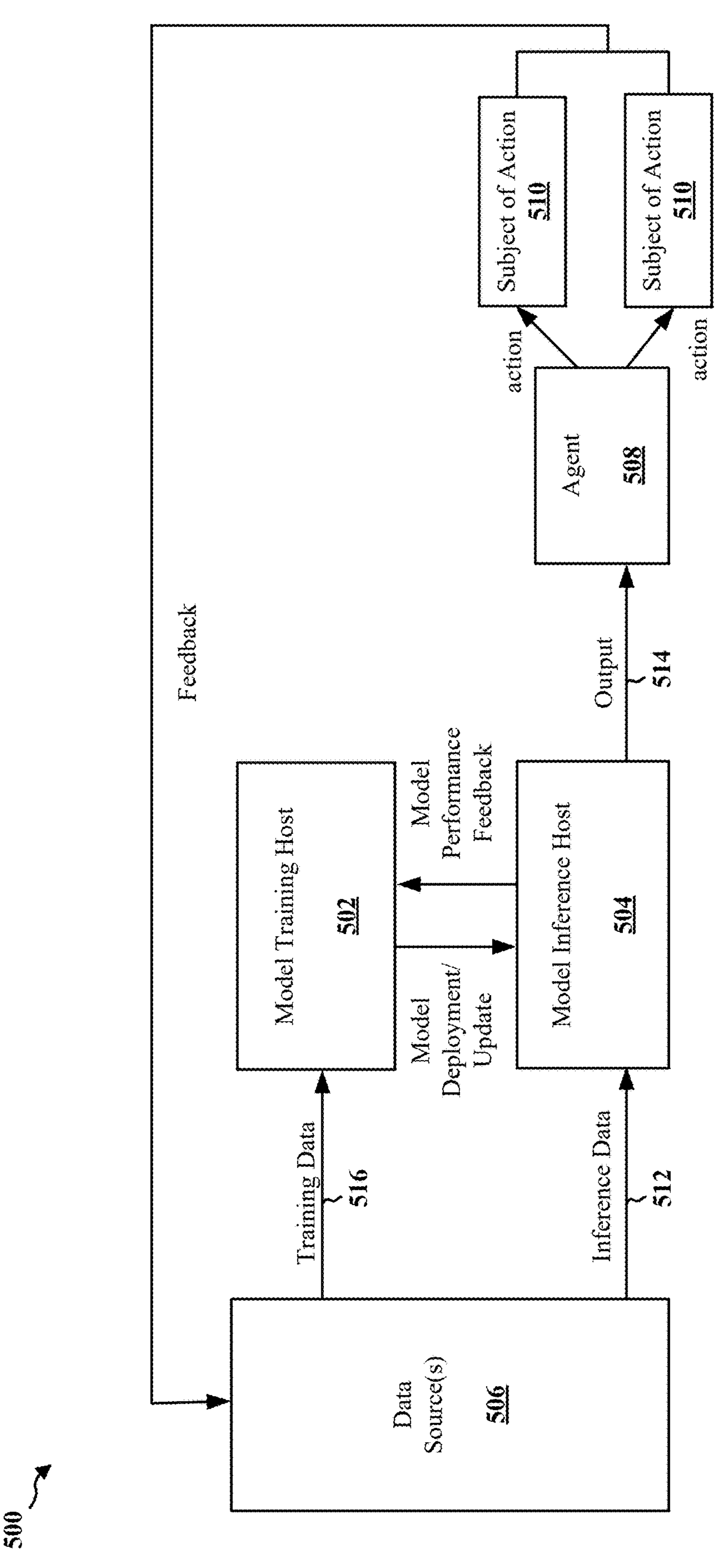
FIG. 5 is a diagram illustrating an example of an artificial intelligence (AI) and machine learning (ML) (AI/ML) algorithm of a method of wireless communication.

FIG. 5 is an illustrative block diagram of an example ML architecture 500 that may be used for wireless communications in any of the various implementations, processes, environments, networks, or use cases listed above. As illustrated, architecture 500 includes multiple logical entities, such as model training host 502, model inference host 504, data source(s) 506, and agent 508. Model inference host 504 is configured to run an ML model based on inference data 512 provided by data source(s) 506. Model inference host 504 may produce output 514, which may include a prediction or inference, such as a discrete or continuous value based on inference data 512, which may then be provided as input to the agent 508.

Agent 508 may represent an element or an entity of a wireless communication system including, for example, a radio access network (RAN), a wireless local area network, a device-to-device (D2D) communications system, etc. As an example, agent 508 may be a user equipment (such as UE 104, referring to FIG. 1, for example), a base station (such as base station 102, referring to FIG. 1, for example), or a disaggregated network entity (such as a CU 110, DU 130, or RU 140 in FIG. 1), an access point, a wireless station, a RAN intelligent controller (RIC) in a cloud-based RAN, among some examples. Additionally, agent 508 may also be a type of agent that depends on the type of tasks performed by model inference host 504, the type of inference data 512 provided to model inference host 504, or the type of output 514 produced by model inference host 504. As an example, the input may be measurements associated with a set of resources (e.g., Set-B beams/resources), and the output may include a set of predictions for a different set of resources (e.g., Set-A beams/resources). A base station or UE may then select a beam for use in transmission and/or reception based on the beam predictions for the Set-A beams output from the AI/ML model.

Agent 508 may perform one or more actions associated with receiving output 514 from model inference host 504, e.g., selection, use, and/or reporting regarding the predictions made for the different set of resources (e.g., Set-A beams/resources). Agent 508 may indicate the one or more actions performed to at least one subject of action 510. In some cases, agent 508 and the subject of action 510 are the same entity.

Data can be collected from data sources 506, and may be used as training data 516 for training an ML model, or as inference data 512 for feeding an ML model inference operation. Data sources 506 may collect data from various subject of action 510 entities (such as the UE or the network entity) and provide the collected data to a model training host 502 for ML model training. In some examples, if output 514 provided to agent 508 is inaccurate (or the accuracy is below an accuracy threshold), model training host 502 may provide feedback to model inference host 504 to modify or retrain the ML model used by model inference host 504, such as via an ML model deployment update.

Model training host 502 may be deployed at the same or a different entity than that in which model inference host 504 is deployed. For example, in order to offload model training processing, which can impact the performance of model inference host 504, model training host 502 may be deployed at a model server.

Example aspects presented herein provide methods and apparatus for signaling procedures between network entities and the UE to measure, assess, and rate the performance of AI/ML models or functionalities and compare it to promised or expected performance benchmarks. Based on this feedback, the entities associated with the AI/ML models or functionalities may refine the AI/ML models (or functionalities) they support.

Figures 6A, 6B:
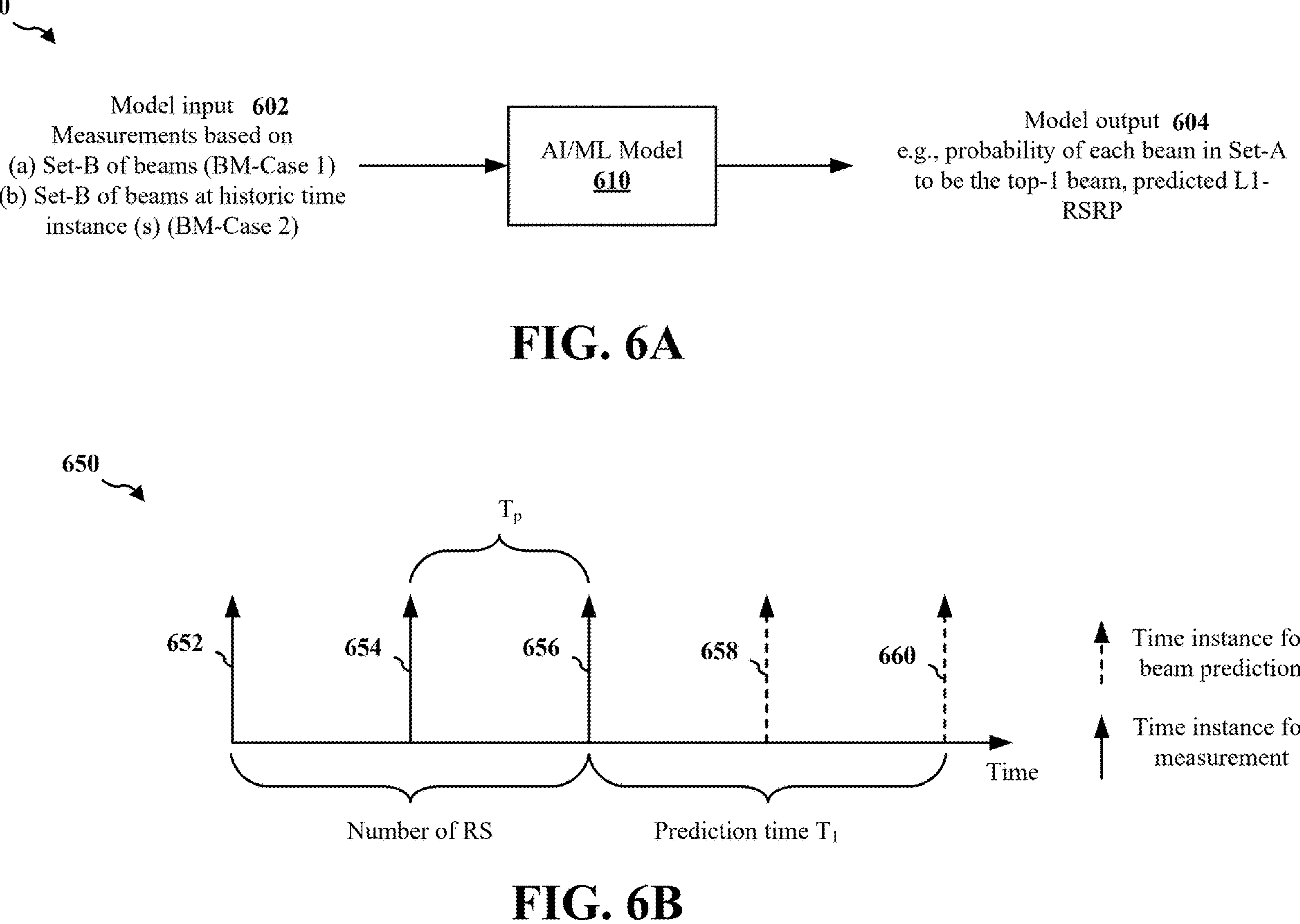
FIG. 6A is a diagram illustrating an example of the inference procedure for beam management.
FIG. 6B is a diagram illustrating an example of temporal beam prediction.

In wireless communication, computer-implemented models, such as AI/ML models, may be used to predict the most suitable transmission settings. For example, AI/ML models may be employed for applications such as beam prediction and channel station information (CSI) feedback compression and prediction. FIG. 6A is a diagram 600 illustrating an example of the inference procedure for beam management. In FIG. 6A, measurements based on Set-B beams may be used as model input 602 for an AI/ML model 610. For example, the AI/ML model 610 may include any of the aspects described in connection with the ANN 400 or the ML architecture 500. In some examples, beam identifier (ID) information may be provided as input to the AI/ML model 610. Based on the model input 602, the AI/ML model 610 may predict, as model output 604, characteristics of Set-A beams, such as layer 1 (L1)-RSRPs for the Set-A beams and the probability of each beam in the Set-A beams to be the top-1 (or top-N) beam(s) (e.g., based on the predicted L1-RSRPs).

In some examples, the AI/ML model 610 may perform temporal beam prediction to predict characteristics of Set-A beams in future time instance(s) based on the measurements from historic time instances(s) of the Set-B beams. FIG. 6B is a diagram 650 illustrating an example of temporal beam prediction. In FIG. 6B, beam measurements made on historical time instance(s), such as time instances 652, 654, 656, may be used as model input to an AI/ML model (e.g., AI/ML model 610) to predict beam characteristics at future time instances, such as time instances 658, 660. In FIG. 6B, the prediction time $T_1$ is the time duration for beam prediction, and $T_p$ is the periodicity for the measurements on the time stances used as model input to the AI/ML model. In some examples, Set-B beams may be a subset of Set-A beams. In some examples, Set-B beams and Set-A beams may be different (e.g., Set-B beams are not a subset of Set-A beams). In some examples, Set-A beams may be the same as Set-B beams.

Figures 7A, 7B:
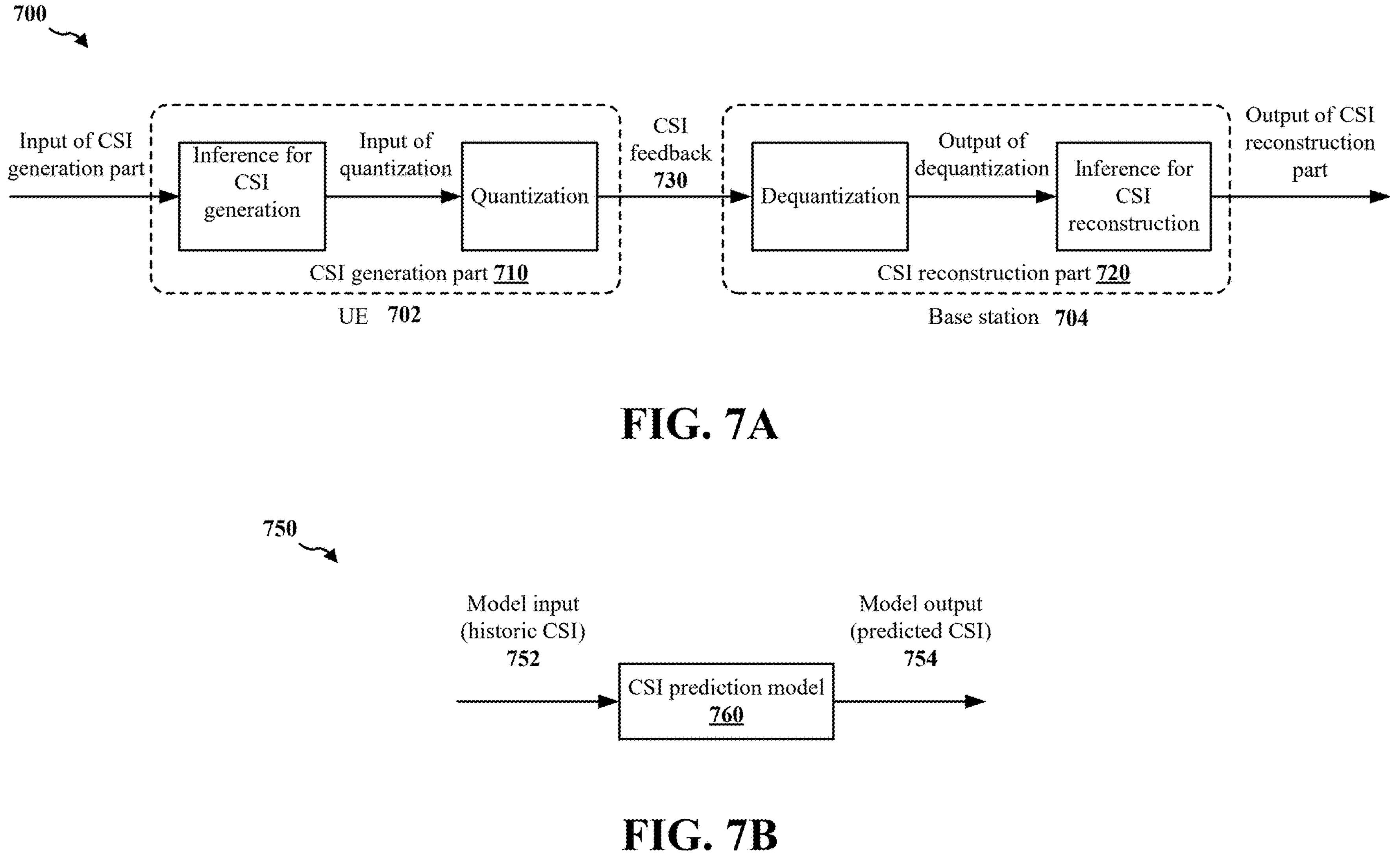
FIG. 7A is a diagram illustrating an example of channel state information (CSI) compression inference procedure.
FIG. 7B is a diagram illustrating an example of the CSI prediction inference procedure.

FIG. 7A is a diagram 700 illustrating an example of the CSI compression inference procedure. In FIG. 7A, the AI/ML model for CSI compression inference may include an AI/ML based CSI generation part 710, which may be located on a UE 702, to generate CSI feedback 730 and an AI/ML based CSI reconstruction part 720, which may be located on a base station 704, for reconstructing the CSI based on the CSI feedback 730. As an example, for the evaluation of the AI/ML based CSI compression, the raw channel matrix, such as channel matrix with the dimension of Tx (e.g., transmit port number), Rx (e.g., receive port number), and frequency unit, and the precoding matrix (which may be reported as a group of eigen vectors) may be used as input (e.g., for the CSI generation part 710) or output (e.g., for the CSI reconstruction part 720) for the AI/ML model.

FIG. 7B is a diagram 750 illustrating an example of the CSI prediction inference procedure. In FIG. 7B, an AI/ML prediction model (e.g., 760) may predict the CSI 754 based on historic CSI 752. For example, the CSI prediction model 760 may include any of the aspects described in connection with the ANN 400 or the ML architecture 500.

As AI/ML models become widely adopted in wireless communication, it is desirable to validate these models after they have been deployed due to the potential for changes or drift in model behavior over time, which can affect performance. One aspect of interest is the process of obtaining feedback or ratings on the capabilities of AI/ML models during the post-deployment phase.

As an example, the evaluation of AI/ML applications for the air interface may include use cases that involve direct interaction between UE and the base station. These use cases may include, for example, CSI feedback (e.g., CSI generation part 710, CSI reconstruction part 720, and CSI prediction model 760) and beam management (e.g., AI/ML model 610), where AI/ML models may be deployed on either the UE side or the network side, or both. For example, the UE may indicate its capabilities on AI/ML functionalities (e.g., AI/ML functionalities based on a UE-side model), such as the UE-side CSI feedback encoder, CSI feedback prediction, and beam prediction in spatial or temporal domains, to the base station. Similarly, the base station may indicate its capabilities on AI/ML functionalities (e.g., AI/ML functionalities based on a network-side model), such as CSI decoding or network-side beam prediction, to the UE.

In some examples, the capability the UE or network entity indicates may include an identifier on promised or expected performance criteria. As used herein, "performance criteria," which may also be referred to as "performance metrics," "performance levels," or "performance" in some aspects, of an AI/ML model refer to parameters that measure the effectiveness or accuracy of the AI/ML model. For example, these performance criteria may include the accuracy of CSI feedback compression or reconstruction, the accuracy of CSI prediction, the accuracy of beam predictions, the expected throughput gains, and associated latency. However, while the performance of an AI/ML model or functionality can be tested offline with a limited number of tests in controlled environments, these tests may not be sufficient to ensure the model's real-world effectiveness due to the vast and varied scenarios encountered post-deployment. For example, the UE or the network entity may encounter a wide range of scenarios, and the actual performance of the AI/ML model or functionality may not align with the anticipated outcomes obtained from the tests and listed in the capability message.

Aspects presented herein provide for the UE or the network entity to obtain feedback or ratings of the performance of AI/ML models or functionalities (e.g., AI/ML model 610, CSI generation part 710, CSI reconstruction part 720, and CSI prediction model 760) to refine the expected performance capabilities of AI/ML models or functionalities post-deployment. For example, the UE or the network entity may indicate a refined capability on the promised or expected AI/ML performance criteria for its supported AI/ML model or functionality. In some examples, the UE or the network entity may apply further refinements or add complexity to the model to match (or exceed) the previously announced performance criteria. The process described above (including the capability indication and subsequent model refinements) may differ from AI/ML monitoring in that it focuses on aligning the actual performance of the models with the stated capabilities (e.g., the capability stated in the capability message) rather than addressing model failures or replacements. In some examples, the process described above may apply to a model that functions adequately with an acceptable performance level, and there may be no model failures or a need for model replacements. In these cases, refining the capability according to the promised or expected performance functionality ensures that expectations of the performance criteria remain aligned with achievable performance criteria.

Example aspects presented herein provide methods and apparatus for the signaling mechanisms for capability feedback or rating for an AI/ML model or functionality in wireless communication. In some aspects, for wireless communication between a UE and a network entity, the AI/ML model may be located on the network side (e.g., on the network entity). To ensure the effectiveness of the AI/ML model (or functionality), the network entity (e.g., gNB) may first announce its target AI/ML performance criteria for the AI/ML model (or functionality). These AI/ML performance criteria may include, for example, accuracy and latency for tasks like CSI feedback compression/prediction or beam prediction. Similarly, the UE may indicate its target AI/ML performance criteria for these AI/ML capabilities. The network entity may indicate to the UE the expected performance criteria (e.g., which may be referred to as promised performance criteria) for its supported AI/ML model (or functionality). In some examples, the network entity may support multiple AI/ML models (or functionalities) and may indicate to the UE the promised or expected performance criteria for each of the multiple supported AI/ML models (or functionalities). The promised or expected performance criteria the UE or network entity indicates may be equivalent to or exceed the performance criteria the UE or network entity aims to achieve using the AI/ML model (or functionality). In some aspects, the network entity (e.g., gNB) may employ multiple models (e.g., multiple AI/ML models) and may switch between them as needed to maintain the promised or expected performance levels.

In some aspects, once an AI/ML model or functionality has been activated on the network side, the network entity (e.g., gNB) may request feedback or rating from the UE regarding the performance criteria of the AI/ML model or functionality supported by the network entity (e.g., gNB). In some examples, while the actual (or achieved) performance criteria of the AI/ML model or functionality may meet the target performance criteria, the actual (or achieved) performance criteria, however, may be below the performance criteria the network or the UE has indicated in the indicator message.

In some examples, the UE may record the performance criteria of the AI/ML method achieved by the network entity by comparing its outcomes of throughput or by comparing with the ground truth measured at the UE. The UE may provide feedback or ratings on the actual achieved performance criteria of the AI/ML model or functionality located on the network side. This feedback may take several forms. In some examples, the feedback may be the achieved performance criteria, a correction to the promised or expected performance criteria, or a confidence indicator on the promised or expected performance criteria. In some examples, the feedback may be a rating that quantifies the performance criteria, or a binary flag indicating whether the network entity has met the expected performance criteria it has indicated.

In some examples, based on the feedback from the UE on the achieved performance criteria, the network entity (e.g., gNB) may adjust (or refine) the capability indicator for its supported AI/ML models or functionalities. In some examples, the network entity (e.g., gNB) may adjust (or refine) the AI/ML models or functionalities. For example, the adjustments may include increasing the complexity of the AI/ML models or adding new layers to enhance the performance criteria, such as accuracy or latency. Additionally, the network entity (e.g., gNB) may aggregate feedback over multiple areas, such as feedback from other neighboring network entities (assuming the AI/ML model or functionality is compatible with these multiple areas and network entities), or feedback from other UEs, allowing for a comprehensive assessment of its AI/ML functionalities across different geographic areas or different UEs. Then, the network entity may adjust or refine the AI/ML models or functionalities based on the aggregated feedback, enhancing the reliability and effectiveness of AI/ML based on the performance assessments over different geographic areas or different UEs.

In some aspects, for wireless communication between a UE and a network entity, the AI/ML model may be located on the UE side. The feedback and rating mechanisms for a UE-side model are similar to those for a model on the network side. However, the entity responsible for providing the target AI/ML performance criteria, expected AI/ML performance criteria, and feedback or ratings on the achieved AI/ML performance criteria may vary due to the changed location of the AI/ML model.

In some aspects, for an AI/ML model located on the UE, the network entity (e.g., gNB) may announce its target AI/ML performance criteria for the AI/ML model (or functionality). These AI/ML performance metrics may include, for example, accuracy and latency for CSI feedback compression/prediction or beam prediction. In some examples, the UE may indicate its target AI/ML performance metrics for these AI/ML capabilities. The UE may further indicate to the network entity the promised or expected performance criteria for its supported AI/ML model (or functionality). In some examples, the UE may support multiple supported AI/ML models (or functionalities) and may indicate to the network entity the promised or expected performance criteria for each of the multiple supported AI/ML models (or functionalities). The promised or expected performance criteria the UE or network entity indicates may be equivalent to or exceed the performance criteria the UE or network entity aims to achieve using the AI/ML model (or functionality). In some aspects, the UE may employ multiple models (e.g., multiple AI/ML models) and may switch between them as needed to maintain the promised or expected performance criteria.

In some aspects, once an AI/ML model or functionality has been activated on the UE side, the UE may request feedback or rating from the network entity regarding the performance criteria of the AI/ML model or functionality supported by the UE. In some examples, while the actual achieved performance criteria of the AI/ML model or functionality may meet the target performance criteria, the actual achieved performance criteria, however, may be below the performance criteria the network or the UE has indicated in the indicator message.

In some examples, the network entity may record the performance criteria of the AI/ML method achieved by the UE by comparing its outcomes of throughput, as an example. The network entity may provide feedback or ratings on the actual achieved performance criteria of the AI/ML model or functionality located on the UE side. This feedback may take several forms. For example, the feedback may be the achieved performance criteria, a correction to the promised or expected performance criteria, or a confidence indicator on the promised or expected performance criteria. In some examples, the feedback may be a rating that quantifies the performance criteria, or a binary flag indicating whether the UE has met the expected performance criteria it has indicated.

In some examples, based on the feedback, the UE may adjust (or refine) the capability indicator for its supported AI/ML models or functionalities. In some examples, the UE may adjust (or refine) the AI/ML models or functionalities. For example, the adjustments may include increasing the complexity of the AI/ML models or adding new layers to enhance the performance level, such as accuracy or latency. Additionally, the UE may aggregate feedback over multiple areas or feedback from multiple network entities (assuming the AI/ML model or functionality is compatible with these multiple areas and network entities), allowing for a comprehensive assessment of its AI/ML functionalities across different geographic areas or different network entities. Then, the UE may adjust or refine the AI/ML models or functionalities based on the aggregated feedback, enhancing the reliability and effectiveness of AI/ML based on the performance assessments over different geographic areas or different network entities.

Figure 8:
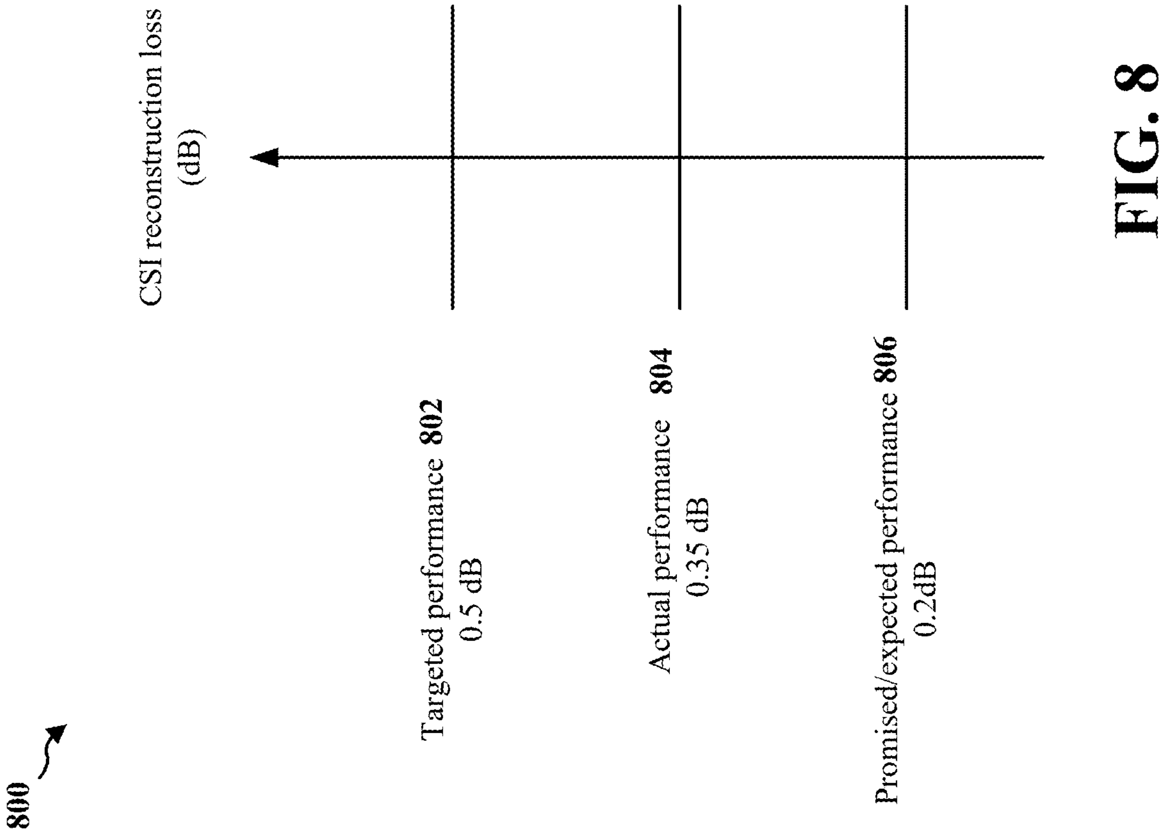
FIG. 8 is a diagram illustrating example feedback mechanisms for the capabilities of CSI reconstruction in accordance with various aspects of the present disclosure.

FIG. 8 is a diagram 800 illustrating example feedback mechanisms for CSI reconstruction in accordance with various aspects of the present disclosure. In the example in FIG. 8, the target performance criterion 802 (e.g., the target CSI reconstruction loss) is 0.5 decibels (dB). To accomplish this, the network entity (e.g., gNB) may indicate its support for AI/ML-based CSI feedback reconstruction with promised or expected performance criterion 806. For example, the network entity may indicate that the first AI/ML model has a promised or expected performance criterion 804 (e.g., expected CSI reconstruction loss) of 0.2 dB. In some examples, the network entity may further indicate the promised or expected performance criterion for one or more other AI/ML models it may support. For example, the network entity may further indicate that the second model has a promised or expected performance criterion (e.g., expected CSI reconstruction loss) of 0.3 dB, and the third model has a promised or expected performance criterion (e.g., expected CSI reconstruction level) of 0.5 dB. The network entity may activate the first model (which has an expected performance criterion of 0.2 dB) for CSI reconstruction and communicate the activation of the first model to the UE. However, the actual performance criterion (e.g., actual CSI reconstruction loss) of the first model, as observed by the UE, may be worse than the promised or expected performance criterion. For example, the actual performance criterion (e.g., actual CSI reconstruction loss) may be 0.35 dB. Despite this discrepancy, the network entity may not need to deactivate or switch out the first model since its performance still meets the target performance criterion (e.g., target CSI reconstruction loss) of 0.5 dB.

In the example of FIG. 8, after activating the first model, the network entity may request feedback or a rating from the UE regarding the performance of the first model. In response to the feedback request, the UE may indicate the actual performance criterion (e.g., actual CSI reconstruction loss) it observed or measured, or suggest to lower model performance. In some examples, the UE may provide an indicator of its confidence or rating (e.g., on a scale from 0 to 1 or 1 to 10) to the model. Based on this feedback, the network entity may adjust the performance capabilities associated with the first model. For example, the network entity may adjust the promised or expected CSI reconstruction loss from 0.2 dB to 0.35 dB to more accurately reflect its real-world performance criterion.

Figure 9:
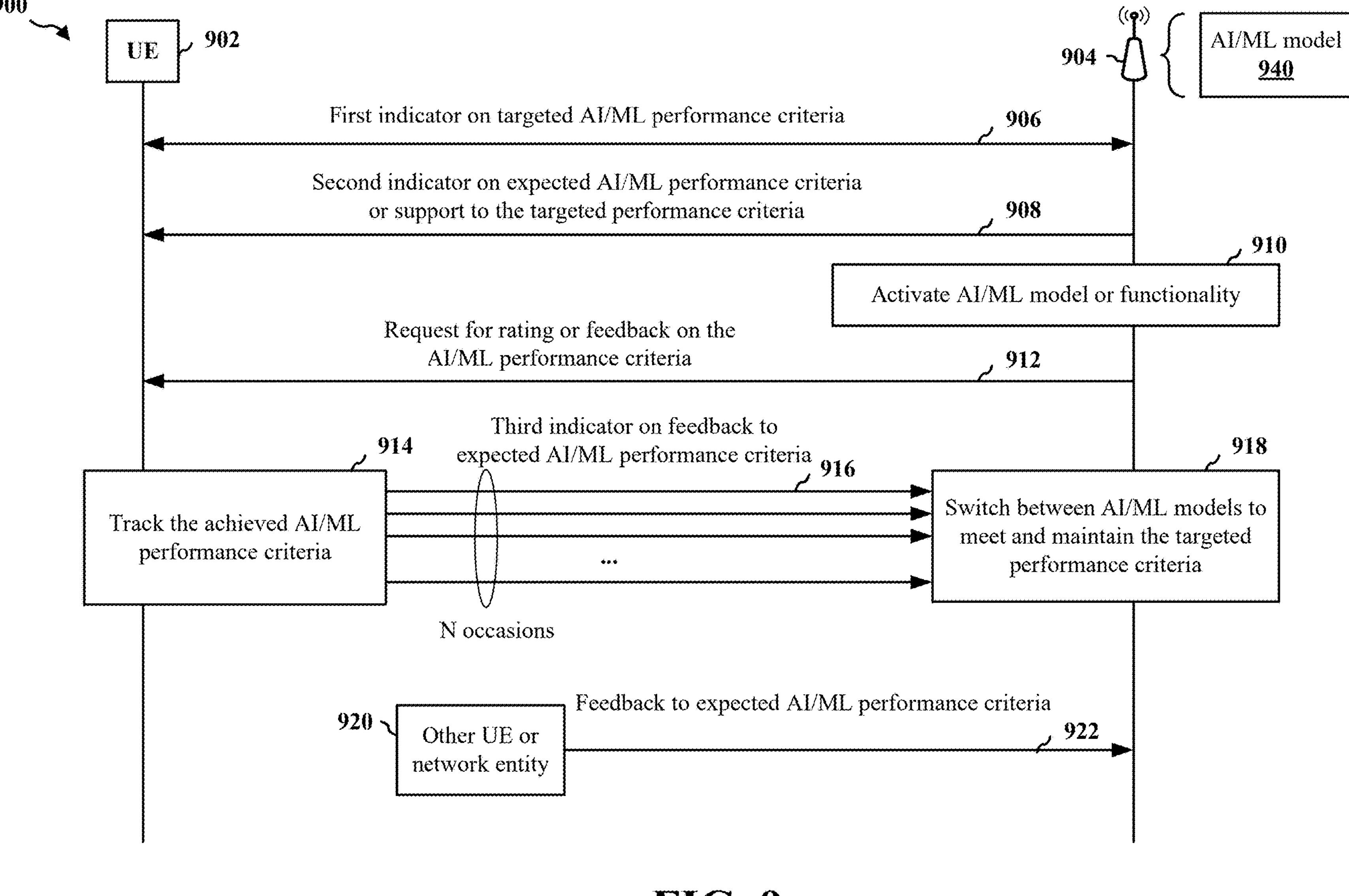
FIG. 9 is a call flow diagram illustrating a method of wireless communication in accordance with various aspects of the present disclosure.

FIG. 9 is a call flow diagram 900 illustrating a method of wireless communication in accordance with various aspects of this present disclosure. Various aspects are described in connection with a UE 902 and a base station 904. The aspects may be performed by the UE 902 or the base station 904 in aggregation and/or by one or more components of a base station 904 (e.g., a CU 110, a DU 130, and/or an RU 140).

In the example of FIG. 9, the base station 904 may include or be associated with an AI/ML model 940. For example, the AI/ML model 940 may include any of the aspects described in connection with the ANN 400 or the ML architecture 500. FIG. 9 illustrates the process of rating and obtaining feedback on the AI/ML model 940 employed at the base station 904. The feedback may be based on the target AI/ML performance criteria and the expected AI/ML performance criteria that are signaled between the UE 902 and base station 904.

As shown in FIG. 9, the base station 904 may, at 906, communicate (e.g., transmit to or receive from) a first indicator with the UE 902. The first indicator may include the target AI/ML performance criteria for a given AI/ML model or functionality (e.g., AI/ML model 940). In some examples, the AI/ML model or functionality (e.g., AI/ML model 940) may be located on or be associated with the base station 904.

At 908, the base station 904 may provide a second indicator to the UE 902. The second indicator may include the expected performance criteria of the AI/ML model or functionality (e.g., AI/ML model 940).

The base station 904 may, at 910, activate the AI/ML model or functionality (e.g., AI/ML model 940). In some examples, the base station 904 may select or alternate between multiple AI/ML models based on one or more of the first indicator or the second indicator (e.g., the target performance criteria or the expected performance criteria previously communicated). For example, the base station 904 may select one AI/ML model whose performance criteria meet or exceed the target performance criteria or the expected performance criteria.

Upon the activation of the AI/ML model (e.g., AI/ML model 940) at 910, and transmit wireless transmission based on the activated AI/ML model (e.g., AI/ML model 940). For example, the base station 904 may transmit wireless transmission based on the CSI prediction or beam prediction result provided by the AI/ML model 940. The base station 904 may, at 912, request the UE 902 to provide a rating or feedback on the AI/ML model's performance criteria observed (or measured) at the UE 902. For example, the feedback on the AI/ML model's performance criteria may be a rating or feedback of achieved the AI/ML model's performance criteria in comparison with the expected AI/ML performance criteria indicated in the second indicator.

In response to the base station's request at 912, the UE 902 may, at 914, track the achieved AI/ML performance criteria and, at 916, send a third indicator of the achieved AI/ML performance criteria to the base station 904.

In some examples, based on the third indicator of the achieved AI/ML performance criteria, the base station 904 may, at 918, switch between multiple AI/ML models to meet or maintain the target AI/ML performance criteria. In some examples, based on the third indicator received from the UE 902, the base station 904 may refine the second indicator (e.g., the expected AI/ML performance criteria).

In some examples, the base station 904 may aggregate feedback on the expected AI/ML performance criteria from other UE or network entities (e.g., at 920), so that the adjustments to the expected AI/ML performance criteria can more accurately reflect actual model performance across a wider operational scope. For example, the base station 904 may aggregate feedback from multiple entities (e.g., UE or base stations) across various geographic areas, as well as from multiple adjacent base stations for the refinement process to the second indicator (e.g., the expected performance criteria).

In some examples, the first and second indicators, representing the target AI/ML performance criteria and expected AI/ML performance criteria respectively, may be communicated via radio resource control (RRC) signaling, including broadcast information (such as posSIB) or UE-specific signaling, medium access control (MAC)-control element (MAC-CE), or DCI. In some examples, the third indicator may be transmitted through uplink control information (UCI) or RRC messages.

Figure 10:
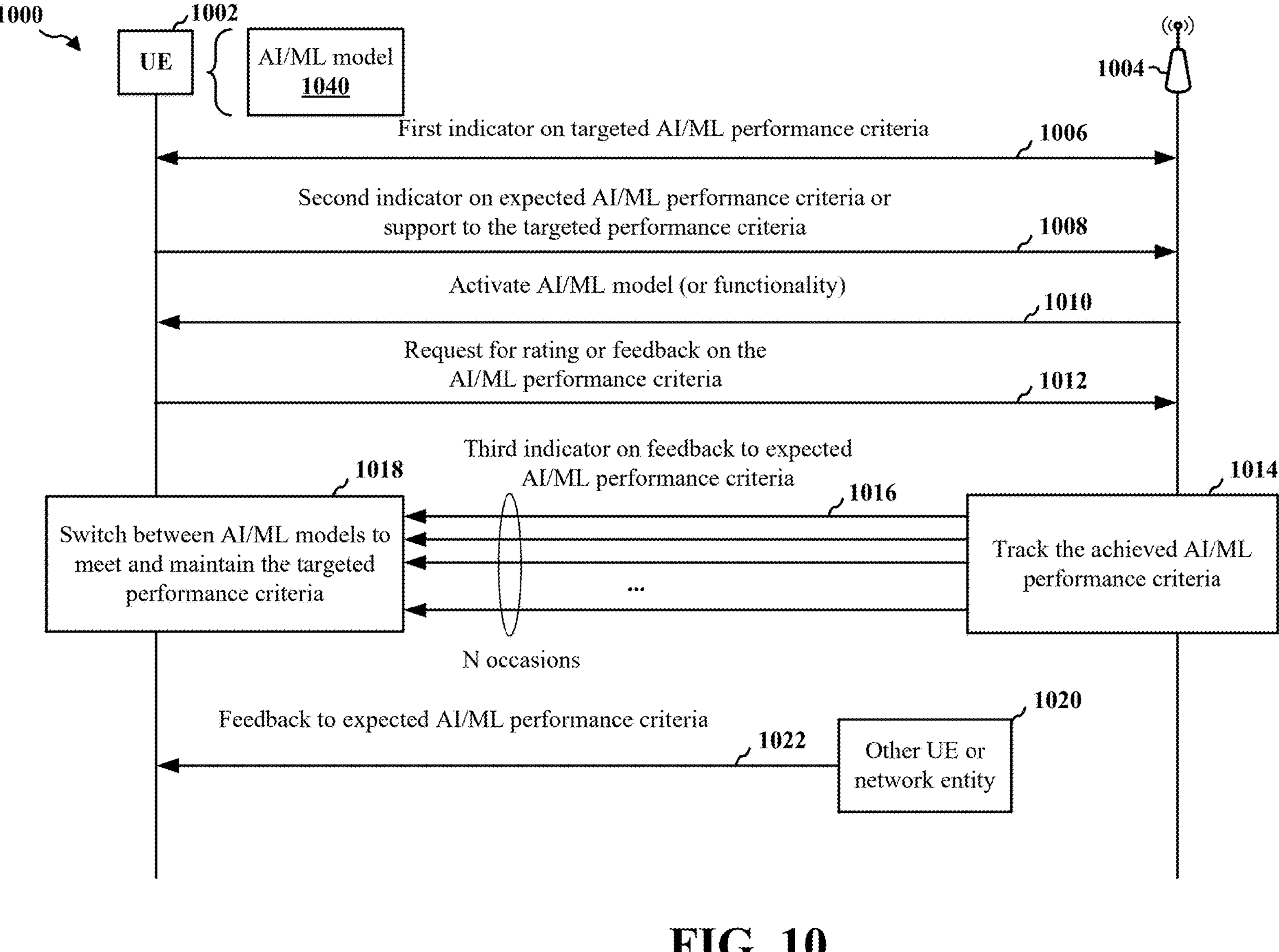
FIG. 10 is a call flow diagram illustrating a method of wireless communication in accordance with various aspects of the present disclosure.

FIG. 10 is a call flow diagram 1000 illustrating a method of wireless communication in accordance with various aspects of this present disclosure. Various aspects are described in connection with a UE 1002 and a base station 1004. The aspects may be performed by the UE 1002 or the base station 1004 in aggregation and/or by one or more components of a base station 904 (e.g., a CU 110, a DU 130, and/or an RU 140).

In the example of FIG. 10, the UE 1002 may include or be associated with an AI/ML model 1040. For example, the AI/ML model 1040 may include any of the aspects described in connection with the ANN 400 or the ML architecture 500. FIG. 10 illustrates the process of rating and obtaining feedback on the AI/ML model 1040 employed at the UE 1002. The feedback may be based on the target AI/ML performance criteria and the expected AI/ML performance criteria signaled between the UE 1002 and base station 1004.

As shown in FIG. 10, the UE 1002, at 1006, may communicate (e.g., transmit to or receive from) a first indicator with the base station 1004. The first indicator may include the target AI/ML performance criteria for a given AI/ML model or functionality (e.g., AI/ML model 1040). In some examples, the AI/ML model or functionality (e.g., AI/ML model 1040) may be located on or be associated with the UE 1002.

At 1008, the UE 1002 may provide a second indicator to the base station 1004. The second indicator may include the expected performance criteria of the AI/ML model (e.g., AI/ML model 1040) or functionality. In some examples, the base station 1004 may, at 1010, activate the AI/ML model (e.g., AI/ML model 1040) or functionality at the UE 1002. In some examples, the UE 1002 may select or alternate between multiple AI/ML models based on one or more of the first indicator or the second indicator (e.g., the target performance criteria or the expected performance criteria previously communicated). For example, the UE 1002 may select one AI/ML model whose performance criteria meet or exceed the target performance criteria or the expected performance criteria.

Upon the activation of the AI/ML model 1040 at 1010, the UE 1002 may, at 1012, request the base station 1004 to provide a rating or feedback on the AI/ML model's performance criteria observed (or measured) at the base station 1004. For example, the feedback on the AI/ML model's performance criteria may be a rating or feedback of the achieved AI/ML model's performance criteria in comparison with the expected AI/ML performance criteria indicated in the second indicator.

In response to the UE's request at 1012, the base station 1004 may, at 1014, track the achieved AI/ML performance criteria and, at 1016, send a third indicator of the achieved AI/ML performance criteria to the UE 1002.

In some examples, based on the third indicator of the achieved AI/ML performance criteria, the UE 1002 may, at 1018, switch between multiple AI/ML models to meet or maintain the target AI/ML performance criteria. In some examples, based on the third indicator received from the base station 1004, the UE 1002 may refine the second indicator (e.g., the expected AI/ML performance criteria).

In some examples, the UE 1002 may aggregate feedback on the expected AI/ML performance criteria from other UE or network entities (e.g., at 1020), so that the adjustments to the expected AI/ML performance criteria can more accurately reflect actual model performance across a wider operational scope. For example, the UE 1002 may aggregate feedback (e.g., at 1022) from multiple entities (e.g., UE or base stations) across various geographic areas, as well as from multiple base stations for the refinement process to the second indicator (e.g., the expected performance criteria).

In some examples, the first and third indicators may be communicated via RRC signaling, including broadcast information (such as posSIB) or UE-specific signaling, MAC-CE, or DCI. In some examples, the second indicator may be transmitted through RRC capability messages.

In some aspects, the first indicator (e.g., the first indicator in 906, 1006) may include a variety of metrics for the target AI/ML performance criteria, such as target values for CSI prediction accuracy, CSI reconstruction loss, beam prediction accuracy, and target values for system performance criteria, such as throughput and latency of running and obtaining the criteria. In some examples, the target values may include target average performance criteria or target percentile ranks (e.g., k-percentile) of performance criteria. In some examples, the target values may include target confidence levels regarding these target performance criteria. For example, the target confidence levels may be expressed as a value in the range of 0 to 1, or as a range of performance criteria around a mean or a percentile value (e.g., k-percentile). The first indicator may set the target performance criteria for the AI/ML model or functionality.

In some aspects, the second indicator (e.g., the second indicator in 908, 1008) may include expected or promised AI/ML performance criteria. For example, the second indicator may include a variety of metrics for the expected or promised AI/ML performance criteria, such as expected values for CSI prediction accuracy, CSI reconstruction loss, beam prediction accuracy, and expected values for system performance criteria, such as throughput and latency of running and obtaining the criteria.

In some examples, the second indicator (e.g., the second indicator in 908, 1008) may include a flag indicating the support for the target performance criteria. In some examples, when the target AI/ML performance criteria are not achievable, the second indicator may further include explanations for the reasons the target AI/ML performance criteria are not achievable. The reasons may include, for example, insufficient battery power, too dense clutter, or environmental conditions different from those encountered during the model's training phase.

In some examples, the expected values may include expected average performance criteria or expected percentile ranks (e.g., k-percentile) of performance criteria. In some examples, the expected values may include expected confidence levels regarding these expected performance criteria. For example, the expected confidence levels may be expressed as a value in the range of 0 to 1, or as a range of expected performance criteria around a mean or a percentile value (e.g., k-percentile).

In some examples, the second indicator (e.g., the second indicator in 908, 1008) may include expected AI/ML performance criteria specific to each AI/ML model or functionality. For example, the second indicator may include expected average performance criteria or expected percentile ranks (e.g., k-percentile) of performance criteria for each AI/ML model or functionality of multiple supported AI/ML models or functionalities. For example, the second indicator may include expected confidence levels regarding these expected performance criteria for each AI/ML model or functionality of multiple supported AI/ML models or functionalities. For example, the expected confidence levels for each AI/ML model or functionality may be expressed as a value in the range of 0 to 1, or as a range of expected performance criteria around a mean or a percentile value (e.g., k-percentile).

In some examples, the second indicator may include information on the complexity of each AI/ML model or functionality of multiple supported AI/ML models or functionalities.

In some aspects, the third indicator (e.g., the third indicator in 916, 1016) may include a variety of metrics for the achieved AI/ML performance criteria. In some examples, the third indicator may include a flag indicating whether the promised or expected AI/ML performance criteria have been met. In some examples, the third indicator may include a rating scale for the promised or expected AI/ML performance criteria. For example, the rating scale may be a scale ranging between 0 and 1 or a more detailed scale between 0 and 10.

In some examples, the achieved AI/ML performance criteria may include achieved average performance criteria or achieved percentile ranks (e.g., k-percentile) of the performance criteria. In some examples, the achieved AI/ML performance criteria may include achieved confidence levels regarding these achieved performance criteria. For example, the achieved confidence levels may be expressed as a value in the range of 0 to 1, or as a range of achieved performance criteria around a mean or a percentile value (e.g., k-percentile).

In some examples, the third indicator (e.g., the third indicator in 916, 1016) may include achieved AI/ML performance criteria specific to each AI/ML model or functionality. For example, the third indicator may include achieved average performance criteria or achieved percentile ranks (e.g., k-percentile) of performance criteria for each AI/ML model or functionality of multiple supported AI/ML models or functionalities. For example, the third indicator may include achieved confidence levels regarding these achieved performance criteria for each AI/ML model or functionality of multiple supported AI/ML models or functionalities. For example, the achieved confidence levels for each AI/ML model or functionality may be expressed as a value in the range of 0 to 1, or as a range of achieved performance outcomes around a mean or a percentile value (e.g., k-percentile).

In some examples, the third indicator (e.g., the third indicator in 916, 1016) may indicate the discrepancies between the achieved AI/ML performance criteria and the expected AI/ML performance criteria. For example, the third indicator may include a correction to expected average performance criteria or achieved specific percentile ranks (e.g., k-percentile) of performance criteria. For example, the third indicator may include a correction to the expected confidence levels. For example, the expected confidence levels may be expressed as a value in the range of 0 to 1, or as a range of expected performance criteria around a mean or a percentile value (e.g., k-percentile).

In some examples, the third indicator (e.g., the third indicator in 916, 1016) may include a correction to the expected AI/ML performance criteria specific to each AI/ML model or functionality. For example, the third indicator may include a correction to the expected performance criteria or expected specific percentile ranks (e.g., k-percentile) of performance criteria for each AI/ML model or functionality of multiple supported AI/ML models or functionalities. In some examples, the third indicator may include a correction to the expected confidence levels regarding these expected performance criteria for each AI/ML model or functionality of multiple supported AI/ML models or functionalities. For example, the expected confidence levels for each AI/ML model or functionality may be expressed as a value in the range of 0 to 1, or as a range of achieved performance outcomes around a mean or specified percentile value (e.g., k-percentile).

Figure 11:
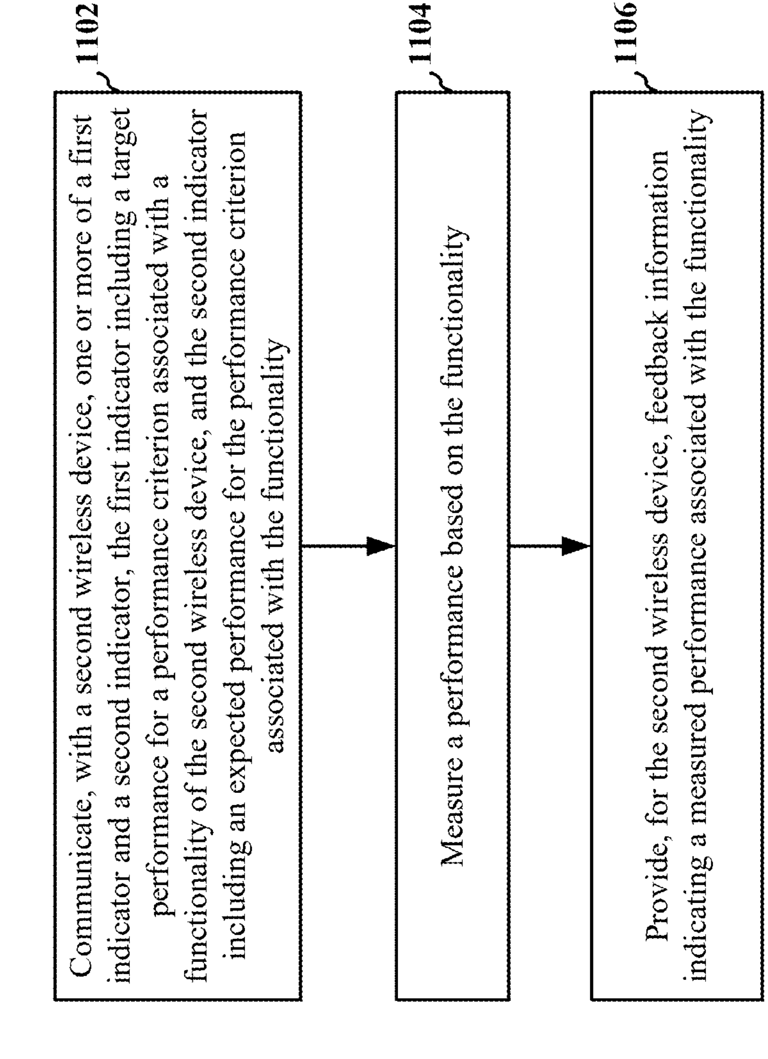
FIG. 11 is a flowchart illustrating methods of wireless communication at a first wireless device in accordance with various aspects of the present disclosure.

FIG. 11 is a flowchart 1100 illustrating methods of wireless communication at a first wireless device in accordance with various aspects of the present disclosure. The method may be performed by the first wireless device in collaboration with a second wireless device. In some examples, the second wireless device may host or be associated with an AI/ML model. For example, in FIG. 9, the first wireless device may be UE 902, and the second wireless device may be base station 904, which has an associated AI/ML model 940. In FIG. 10, the first wireless device may be base station 1004, and the second wireless device may be UE 1002, which has an associated AI/ML model 1040. The description in connection with flowchart 1100 will use the example where the first wireless device is a UE, such as UE 104, 350, 902, or the apparatus 1304 in the hardware implementation of FIG. 13, and the second wireless device is a base station, or a component of a base station, in the access network of FIG. 1 or a core network component (e.g., base station 102, 310, 904; or the network entity 1302 in the hardware implementation of FIG. 13). By providing signaling mechanisms for feedback and rating of computer-implemented models, such as AI/ML models, the methods allow for continuous post-deployment validation of these models, thereby ensuring the models remain effective and adapt to varying real-world scenarios and performance changes or drifts over time. Additionally, by allowing adaptive refinements to a model or the switch between different models based on real-world performance feedback, the described techniques ensure that the best-performing model is in use without disrupting the ongoing operations of the UE or the network. By aggregating performance feedback across multiple wireless devices, the methods enable more precise adjustments and improvements to the model.

As shown in FIG. 11, at 1102, the first wireless device may communicate, with the second wireless device, one or more of a first indicator and a second indicator. The first indicator may include a target performance for a performance criterion associated with a functionality of the second wireless device, and the second indicator may include an expected performance for the performance criterion associated with the functionality. FIG. 8, FIG. 9, and FIG. 10 illustrate various aspects of the steps in connection with flowchart 1100. For example, referring to FIG. 9, the first wireless device (UE 902) may, at 906, communicate, with the second wireless device (base station 904), a first indicator. The first indicator may include a target performance for a performance criterion associated with a functionality of the second wireless device (e.g., target AI/ML performance criteria). At 908, the first wireless device (UE 902) may receive, from the second wireless device (base station 904), a second indicator. The second indicator may include an expected performance for the performance criterion associated with the functionality (e.g., expected AI/ML performance criteria). In some aspects, 1102 may be performed by the performance feedback component 198.

At 1104, the first wireless device may measure a performance based on the functionality. For example, referring to FIG. 9, the first wireless device (UE 902) may measure a performance based on the functionality (e.g., track the achieved AI/ML performance criteria at 914). In some aspects, 1104 may be performed by the performance feedback component 198.

At 1106, the first wireless device may provide, for the second wireless device, feedback information indicating a measured performance associated with the functionality. For example, referring to FIG. 9, the first wireless device (UE 902) may, at 916, provide, for the second wireless device (base station 904), feedback information indicating a measured performance associated with the functionality (e.g., the third indicator on feedback to expected AI/ML performance criteria). In some aspects, 1106 may be performed by the performance feedback component 198.

In some aspects, the functionality may be associated with an artificial intelligence/machine learning (AI/ML) functionality or an AI/ML model. For example, referring to FIG. 9, FIG. 10, the functionality may be associated with an AI/ML model 940 or 10 40. For example, the AI/ML model 940 or 1040 may include any of the aspects described in connection with the ANN 400 or the ML architecture 500.

In some aspects, the functionality may include one or more of: a channel state information (CSI) prediction, a CSI feedback compression, a CSI feedback reconstruction, or a beam prediction. For example, referring to FIG. 9, the functionality (at 910) may include one or more of: the CSI prediction, the CSI feedback compression, the CSI feedback reconstruction, or a beam prediction.

In some aspects, the performance criterion associated with the functionality may include one or more of: the accuracy of the functionality, a loss value of the functionality, a throughput gain associated with the functionality, or a latency associated with the functionality. For example, referring to FIG. 9, the performance criterion associated with the functionality (at 906, 908, 916) may include one or more of: the accuracy of the functionality, a loss value of the functionality, a throughput gain associated with the functionality, or a latency associated with the functionality.

In some aspects, the target performance may include one or more of: a target average or a target k-percentile for the performance criterion associated with the functionality, or a target range for the target average or the target k-percentile. For example, referring to FIG. 9, the target performance included in the first indicator (at 906) may include one or more of: a target average or a target k-percentile for the performance criterion associated with the functionality, or a target range for the target average or the target k-percentile.

In some aspects, the expected performance may include one or more of: an expected average or an expected k-percentile for the performance criterion associated with the functionality, an expected range for the expected average or the expected k-percentile, a plurality of expected averages or expected k-percentiles respectively corresponding to a plurality of candidate AI/ML models or candidate functionalities, a plurality of expected ranges respectively corresponding to the plurality of expected averages or expected k-percentiles, or complexity information respectively corresponding to the plurality of candidate AI/ML models or candidate functionalities. For example, referring to FIG. 9, the expected performance included in the second indicator (e.g., at 908) may include one or more of: an expected average or an expected k-percentile for the performance criterion associated with the functionality, an expected range for the expected average or the expected k-percentile, a plurality of expected averages or expected k-percentiles respectively corresponding to a plurality of candidate AI/ML models or candidate functionalities, a plurality of expected ranges respectively corresponding to the plurality of expected averages or expected k-percentiles, or complexity information respectively corresponding to the plurality of candidate AI/ML models or candidate functionalities.

In some aspects, the second indicator may further include a flag indicating whether the target performance can be met. For example, referring to FIG. 9, the second indicator (at 908) may further include a flag indicating whether the target performance included in the first indicator (at 906) can be met.

In some aspects, to communicate the one or more of the first indicator and the second indicator (at 1102), the first wireless device may transmit or receive the one or more of the first indicator and the second indicator via one or more of: RRC signaling, a MAC-CE, or DCI. For example, referring to FIG. 9, the first wireless device (UE 902) may transmit or receive the one or more of the first indicator (at 906) and the second indicator (at 908) via one or more of: RRC signaling, a MAC-CE, or DCI.

In some aspects, to communicate the one or more of the first indicator and the second indicator (at 1102), the first wireless device may transmit or receive the first indicator; and receive, from the second wireless device and based on the first indicator, the second indicator. For example, referring to FIG. 9, the first wireless device (UE 902) may transmit or receive the first indicator (at 906); and receive, at 908, from the second wireless device (base station 904) and based on the first indicator (at 906), the second indicator.

In some aspects, to transmit or receive the first indicator, the first wireless device may receive, from the second wireless device, the first indicator, or indicate, for the second wireless device, the first indicator. For example, referring to FIG. 9, at 906, the first wireless device (UE 902) may receive, from the second wireless device (base station 904), the first indicator, or indicate, for the second wireless device (base station 904), the first indicator.

In some aspects, the feedback information may be included in one or more of UCI or an RRC message, and the feedback information may include one or more of: a rating on the expected performance, an achieved average or an achieved k-percentile for the performance criterion associated with the functionality, a plurality of achieved averages of achieved k-percentiles respectively corresponding to a plurality of candidate AI/ML models or candidate functionalities, a plurality of achieved ranges respectively corresponding to the plurality of candidate AI/ML models or candidate functionalities, a first correction to an expected average or an expected k-percentile, a range correction to an expected range for the expected average or the expected k-percentile, a plurality of corrections respectively corresponding to a plurality of expected averages or a plurality of expected k-percentiles, or a plurality of range corrections respectively corresponding to a plurality of expected ranges. For example, referring to FIG. 9, the feedback information (at 916) may be included in one or more of UCI or an RRC message, and the feedback information may include one or more of: a rating on the expected performance, an achieved average or an achieved k-percentile for the performance criterion associated with the functionality, a plurality of achieved averages of achieved k-percentiles respectively corresponding to a plurality of candidate AI/ML models or candidate functionalities, a plurality of achieved ranges respectively corresponding to the plurality of candidate AI/ML models or candidate functionalities, a first correction to an expected average or an expected k-percentile, a range correction to an expected range for the expected average or the expected k-percentile, a plurality of corrections respectively corresponding to a plurality of expected averages or a plurality of expected k-percentiles, or a plurality of range corrections respectively corresponding to a plurality of expected ranges.

In some aspects, the feedback information may further include a flag indicating whether the expected performance is met. For example, referring to FIG. 9, the feedback information (at 916) may further include a flag indicating whether the expected performance included in the second indicator (at 908) is met.

Figure 12:
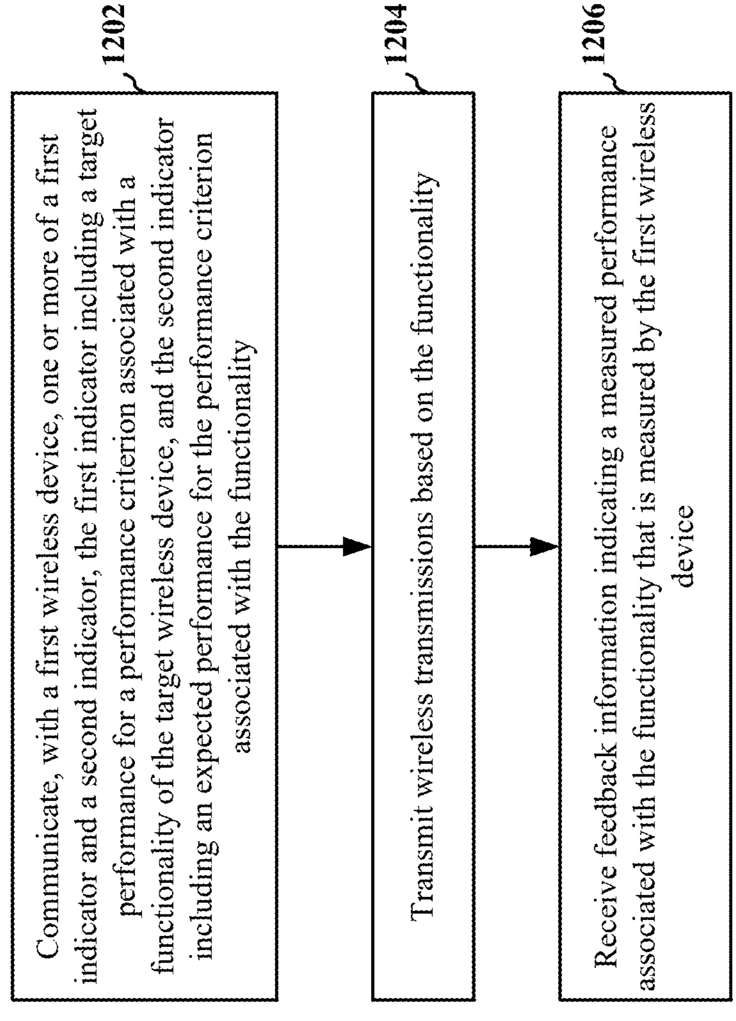
FIG. 12 is a flowchart illustrating methods of wireless communication at a target wireless device in accordance with various aspects of the present disclosure.

FIG. 12 is a flowchart 1200 illustrating methods of wireless communication at a target wireless device in accordance with various aspects of the present disclosure. The method may be performed by the target wireless device in collaboration with a first wireless device. In some examples, the target wireless device may host or be associated with an AI/ML model. For example, in FIG. 9, the first wireless device may be UE 902, and the target wireless device may be base station 904, which has an associated AI/ML model 940. In FIG. 10, the first wireless device may be base station 1004, and the target wireless device may be UE 1002, which has an associated AI/ML model 1040. The description in connection with flowchart 1200 will use the example where the first wireless device is a UE, such as UE 104, 350, 902, or the apparatus 1304 in the hardware implementation of FIG. 13, and the target wireless device is a base station, or a component of a base station, in the access network of FIG. 1 or a core network component (e.g., base station 102, 310, 904; or the network entity 1302 in the hardware implementation of FIG. 13). By providing signaling mechanisms for feedback and rating of computer-implemented models, such as AI/ML models, the methods allow for continuous post-deployment validation of these models, thereby ensuring the models remain effective and adapt to varying real-world scenarios and performance changes or drifts over time. Additionally, by allowing adaptive refinements to a model or the switch between different models based on real-world performance feedback, the described techniques ensure that the best-performing model is in use without disrupting the ongoing operations of the UE or the network. By aggregating performance feedback across multiple wireless devices, the methods enable more precise adjustments and improvements to the model.

As shown in FIG. 12, at 1202, the target wireless device may communicate, with a first wireless device, one or more of a first indicator and a second indicator. The first indicator may include a target performance for a performance criterion associated with a functionality of the target wireless device, and the second indicator may include an expected performance for the performance criterion associated with the functionality. FIG. 8, FIG. 9, and FIG. 10 illustrate various aspects of the steps in connection with flowchart 1200. For example, referring to FIG. 9, the target wireless device (base station 904) may, at 906, communicate, with the first wireless device (UE 902), a first indicator. The first indicator may include a target performance for a performance criterion associated with a functionality of the wireless device (e.g., target AI/ML performance criteria associated with AI/ML model 940). At 908, the target wireless device (base station 904) may transmit, for the first wireless device (UE 902), a second indicator. The second indicator may include an expected performance for the performance criterion associated with the functionality (e.g., expected AI/ML performance criteria associated with AI/ML model 940). In some aspects, 1202 may be performed by the performance feedback component 199.

At 1204, the target wireless device may transmit wireless transmissions based on the functionality. For example, referring to FIG. 9, the target wireless device (base station 904) may, at 910, activate AI/ML model or functionality and transmit wireless transmissions based on the activated functionality. For example, the target wireless device (base station 904) may transmit wireless transmission based on the CSI prediction or beam prediction result provided by the AI/ML model 940. In some aspects, 1204 may be performed by the performance feedback component 199.

At 1206, the target wireless device may receive feedback information indicating a measured performance associated with the functionality that is measured by the first wireless device. For example, referring to FIG. 9, the target wireless device (base station 904) may, at 916, receive feedback information indicating a measured performance associated with the functionality that is measured by the first wireless device (UE 902). In some aspects, 1206 may be performed by the performance feedback component 199.

In some aspects, the functionality may include one or more of: a channel state information (CSI) prediction, a CSI feedback compression, a CSI feedback reconstruction, or a beam prediction, and the performance criterion associated with the functionality may include one or more of: an accuracy of the functionality, a loss value of the functionality, a throughput gain associated with the functionality, or a latency associated with the functionality. For example, referring to FIG. 9, the functionality the base station 904 activated at 910 may include one or more of: a CSI prediction, a CSI feedback compression, a CSI feedback reconstruction, or a beam prediction, and the performance criterion associated with the functionality may include one or more of: an accuracy of the functionality, a loss value of the functionality, a throughput gain associated with the functionality, or a latency associated with the functionality.

In some aspects, the functionality may be associated with an AI/ML functionality or an AI/ML model, and the target wireless device may select, based on the target performance, the AI/ML functionality or the AI/ML model from a plurality of candidate AI/ML functionalities or candidate AI/ML models. The expected performance may be associated with the AI/ML functionality or the AI/ML model, and the expected performance may be better than the target performance. For example, referring to FIG. 9, the functionality may be associated with an AI/ML functionality or an AI/ML model (e.g., AI/ML model 940), and the target wireless device (base station 904) may select, based on the target performance included in the first indicator (at 906), the AI/ML functionality or the AI/ML model from a plurality of candidate AI/ML functionalities or candidate AI/ML models. The expected performance include in the second indicator (at 908) may be associated with the AI/ML functionality or the AI/ML model, and the expected performance may be better than the target performance.

In some aspects, the functionality may be associated with an AI/ML functionality or an AI/ML model. To receive the feedback information (at 1206), the target wireless device may transmit, for the first wireless device, a feedback request for the feedback information; and receive the feedback information in response to the feedback request. For example, referring to FIG. 9, the functionality (at 910) may be associated with an AI/ML functionality or an AI/ML model (e.g., AI/ML model 940). To receive the feedback information (at 916), the target wireless device (base station 904) may, at 912, transmit, for the first wireless device (UE 902), a feedback request for the feedback information; and receive, at 916, the feedback information in response to the feedback request (at 912).

In some aspects, the feedback information may be included in one or more of: UCI, or an RRC message. For example, referring to FIG. 9, the feedback information (at 916) may be included in UCI or an RRC message.

In some aspects, the functionality may be associated with an AI/ML functionality or an AI/ML model, and the target wireless device may adjust, based on the feedback information, the second indicator, the AI/ML functionality, or the AI/ML model. For example, referring to FIG. 9, the functionality may be associated with an AI/ML functionality or an AI/ML model, and the target wireless device (base station 904) may adjust the second indicator (e.g., adjust the expected AI/ML performance criteria at 908), the AI/ML functionality (e.g., adjust the AI/ML functionality at 910), or the AI/ML model (e.g., adjust AI/ML model 940) based on the feedback information (at 916).

In some aspects, the target wireless device may receive, from a third wireless device, second feedback information indicating a second measured performance associated with the functionality measured on the third wireless device. To adjust the second indicator, the AI/ML functionality, or the AI/ML model, the target wireless device may adjust, based on an aggregation of feedback from the first wireless device and the third wireless device, the second indicator, the AI/ML functionality, or the AI/ML model. For example, referring to FIG. 9, the target wireless device (base station 904) may receive, at 922, from a third wireless device (e.g., other UE or network entity 920), second feedback information indicating a second measured performance associated with the functionality measured on the third wireless device (e.g., another UE or network entity 920). The target wireless device (e.g., base station 904) may adjust the second indicator (e.g., adjust the second indicator on expected AI/ML performance criteria), the AI/ML functionality (e.g., adjust the AI/ML functionality at 910), or the AI/ML model (e.g., adjust AI/ML model 940) based on an aggregation of feedback from the first wireless device (UE 902) and the third wireless device (e.g., another UE or network entity 920).

Figure 13:
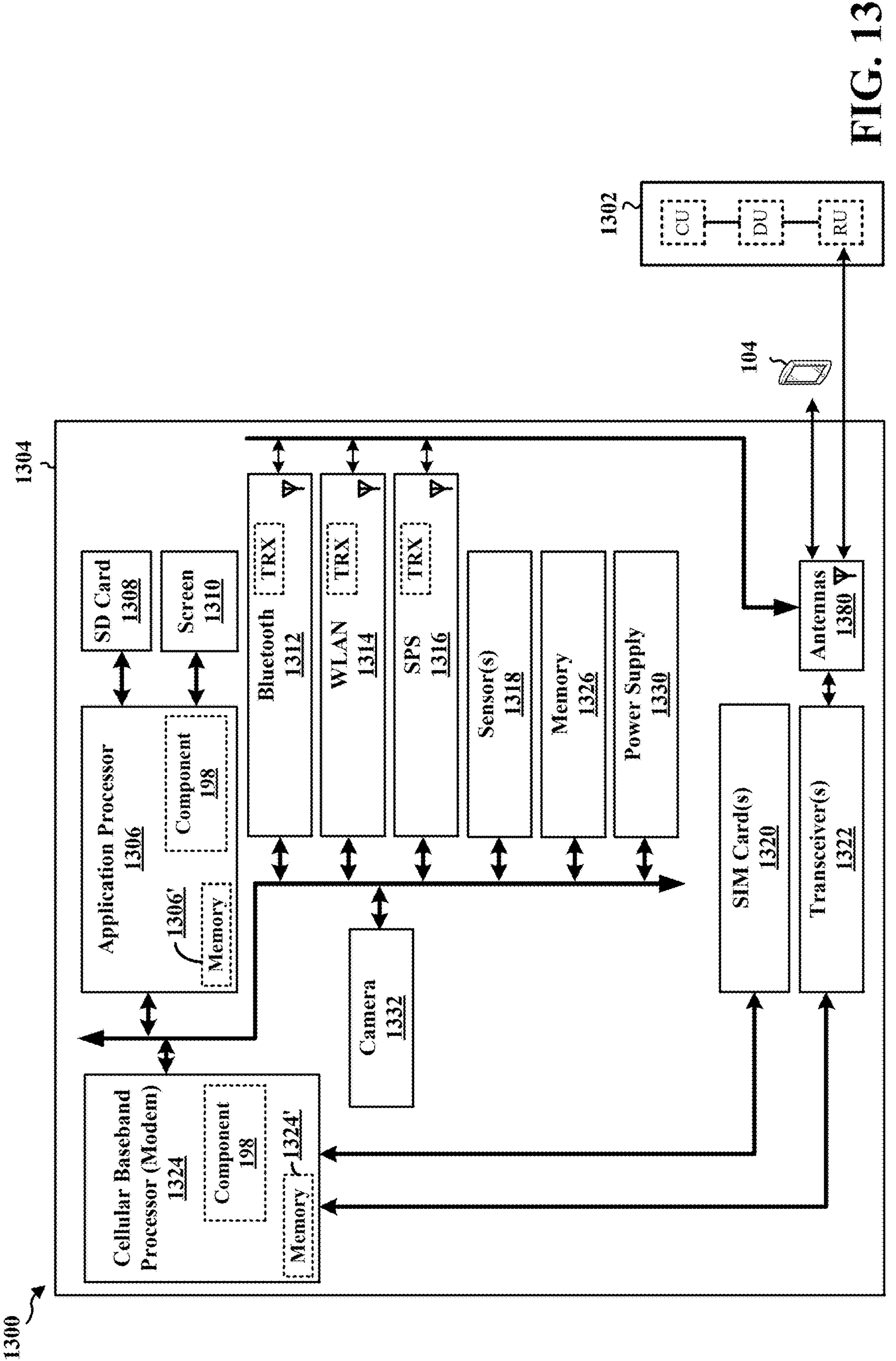
FIG. 13 is a diagram illustrating an example of a hardware implementation for an example apparatus and/or UE.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor (or processing circuitry) 1324 (also referred to as a modem) coupled to one or more transceivers 1322 (e.g., cellular RF transceiver). The cellular baseband processor(s) (or processing circuitry) 1324 may include at least one on-chip memory (or memory circuitry) 1324'. In some aspects, the apparatus 1304 may further include one or more subscriber identity modules (SIM) cards 1320 and at least one application processor (or processing circuitry) 1306 coupled to a secure digital (SD) card 1308 and a screen 1310. The application processor(s) (or processing circuitry) 1306 may include on-chip memory (or memory circuitry) 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) (or processing circuitry) 1324 communicates through the transceiver(s) 1322 via one or more antennas 1380 with the UE 104 and/or with an RU associated with a network entity 1302. The cellular baseband processor(s) (or processing circuitry) 1324 and the application processor(s) (or processing circuitry) 1306 may each include a computer-readable medium/memory (or memory circuitry) 1324', 1306', respectively. The additional memory modules 1326 may also be considered a computer-readable medium/memory (or memory circuitry). Each computer-readable medium/memory (or memory circuitry) 1324', 1306', 1326 may be non-transitory. The cellular baseband processor(s) (or processing circuitry) 1324 and the application processor(s) (or processing circuitry) 1306 are each responsible for general processing, including the execution of software stored on the computer-readable medium/memory (or memory circuitry). The software, when executed by the cellular baseband processor(s) (or processing circuitry) 1324/application processor(s) (or processing circuitry) 1306, causes the cellular baseband processor(s) (or processing circuitry) 1324/application processor(s) (or processing circuitry) 1306 to perform the various functions described supra. The cellular baseband processor(s) (or processing circuitry) 1324 and the application processor(s) (or processing circuitry) 1306 are configured to perform the various functions described supra based at least in part of the information stored in the memory (or memory circuitry). That is, the cellular baseband processor(s) (or processing circuitry) 1324 and the application processor(s) (or processing circuitry) 1306 may be configured to perform a first subset of the various functions described supra without information stored in the memory and may be configured to perform a second subset of the various functions described supra based on the information stored in the memory. The computer-readable medium/memory (or memory circuitry) may also be used for storing data that is manipulated by the cellular baseband processor(s) (or processing circuitry) 1324/application processor(s) (or processing circuitry) 1306 when executing software. The cellular baseband processor(s) (or processing circuitry) 1324/application processor(s) (or processing circuitry) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) (or processing circuitry) 1324 and/or the application processor(s) (or processing circuitry) 1306, and in another configuration, the apparatus 1304 may be the entire UE (e.g., see UE 350 of FIG. 3) and include the additional modules of the apparatus 1304.

As discussed supra, the component 198 may be configured to communicate, with a second wireless device, one or more of a first indicator and a second indicator, the first indicator including a target performance for a performance criterion associated with a functionality of the second wireless device, and the second indicator including an expected performance for the performance criterion associated with the functionality; measure a performance based on the functionality; and provide, for the second wireless device, feedback information indicating a measured performance associated with the functionality. The component 198 may be further configured to perform any of the aspects described in connection with the flowchart in FIG. 11, and/or performed by the UE 902 in FIG. 9. The component 198 may be within the cellular baseband processor(s) (or processing circuitry) 1324, the application processor(s) (or processing circuitry) 1306, or both the cellular baseband processor(s) (or processing circuitry) 1324 and the application processor(s) (or processing circuitry) 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) (or processing circuitry) 1324 and/or the application processor(s) (or processing circuitry) 1306, includes means for communicating, with a second wireless device, one or more of a first indicator and a second indicator, the first indicator including a target performance for a performance criterion associated with a functionality of the second wireless device, and the second indicator including an expected performance for the performance criterion associated with the functionality, means for measuring a performance based on the functionality, and means for providing, for the second wireless device, feedback information indicating a measured performance associated with the functionality. The apparatus 1304 may further include means for performing any of the aspects described in connection with the flowchart in FIG. 11 and/or aspects performed by the UE 902 in FIG. 9. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
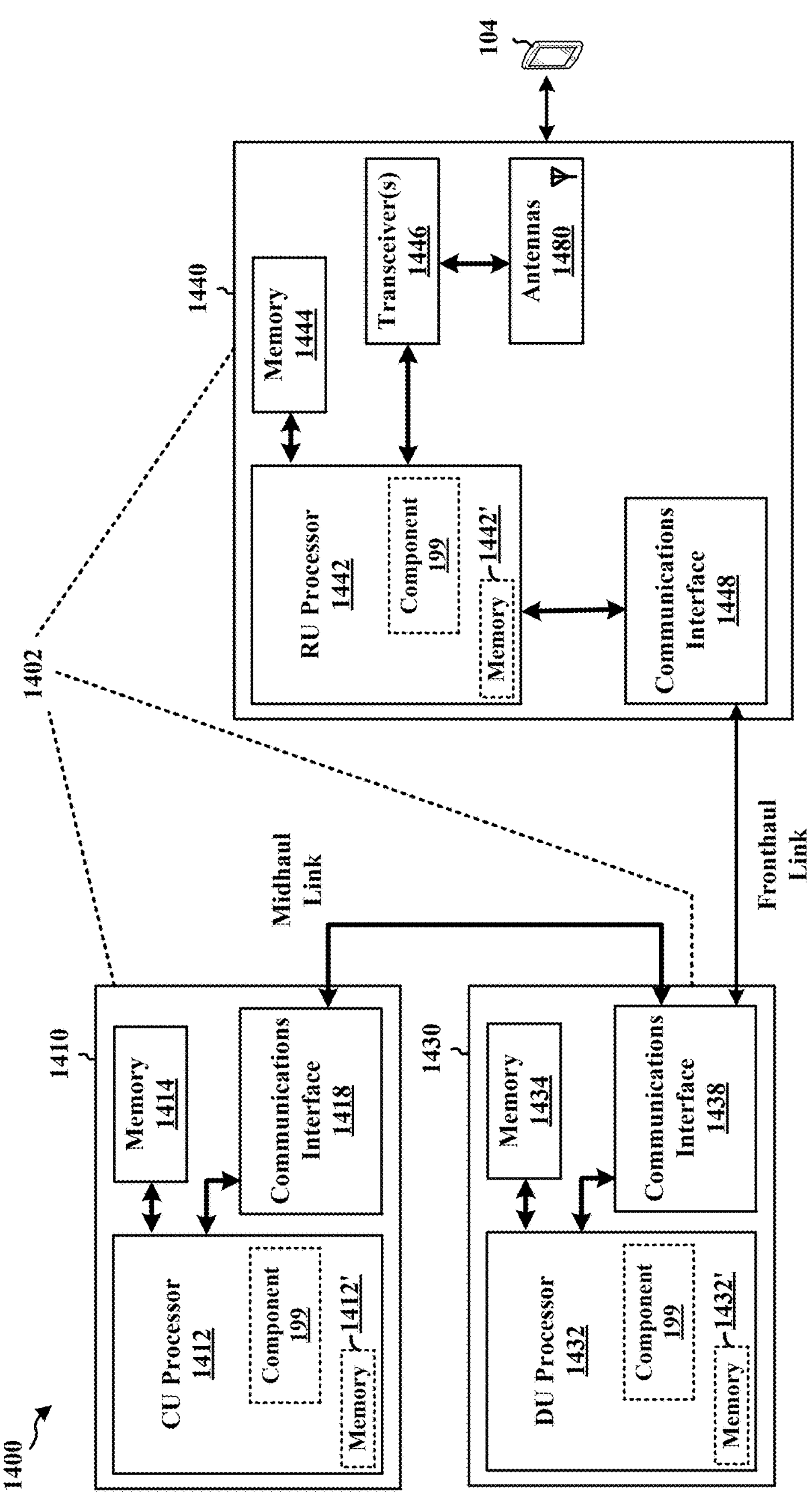
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor (or processing circuitry) 1412. The CU processor(s) (or processing circuitry) 1412 may include on-chip memory (or memory circuitry) 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor (or processing circuitry) 1432. The DU processor(s) (or processing circuitry) 1432 may include on-chip memory (or memory circuitry) 1432'. In some aspects, the DU 1430 may further include additional memory modules 1434 and a communications interface 1438. The DU 1430 communicates with the RU 1440 through a fronthaul link. The RU 1440 may include at least one RU processor (or processing circuitry) 1442. The RU processor(s) (or processing circuitry) 1442 may include on-chip memory (or memory circuitry) 1442'. In some aspects, the RU 1440 may further include additional memory modules 1444, one or more transceivers 1446, antennas 1480, and a communications interface 1448. The RU 1440 communicates with the UE 104. The on-chip memory (or memory circuitry) 1412', 1432', 1442' and the additional memory modules 1414, 1434, 1444 may each be considered a computer-readable medium/memory (or memory circuitry). Each computer-readable medium/memory (or memory circuitry) may be non-transitory. Each of the processors (or processing circuitry) 1412, 1432, 1442 is responsible for general processing, including the execution of software stored on the computer-readable medium/memory (or memory circuitry). The software, when executed by the corresponding processor(s) (or processing circuitry) causes the processor(s) (or processing circuitry) to perform the various functions described supra. The computer-readable medium/memory (or memory circuitry) may also be used for storing data that is manipulated by the processor(s) (or processing circuitry) when executing software.

As discussed supra, the component 199 may be configured to communicate, with a first wireless device, one or more of a first indicator and a second indicator, the first indicator including a target performance for a performance criterion associated with a functionality of the target wireless device, and the second indicator including an expected performance for the performance criterion associated with the functionality; transmit wireless transmissions based on the functionality; and receive feedback information indicating a measured performance associated with the functionality that is measured by the first wireless device. The component 199 may be further configured to perform any of the aspects described in connection with the flowchart in FIG. 12, and/or performed by the base station 904 in FIG. 9. The component 199 may be within one or more processors (or processing circuitry) of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 includes means for communicating, with a first wireless device, one or more of a first indicator and a second indicator, the first indicator including a target performance for a performance criterion associated with a functionality of the target wireless device, and the second indicator including an expected performance for the performance criterion associated with the functionality, means for transmitting wireless transmissions based on the functionality, and means for receiving feedback information indicating a measured performance associated with the functionality that is measured by the first wireless device. The network entity 1402 may further include means for performing any of the aspects described in connection with the flowchart in FIG. 12, and/or aspects performed by the base station 904 in FIG. 9. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a first wireless device. The method may include communicating, with a second wireless device, one or more of a first indicator and a second indicator, the first indicator including a target performance for a performance criterion associated with a functionality of the second wireless device, and the second indicator including an expected performance for the performance criterion associated with the functionality; measuring a performance based on the functionality; and providing, for the second wireless device, feedback information indicating a measured performance associated with the functionality. By providing signaling mechanisms for feedback and rating of computer-implemented models, such as AI/ML models, the methods allow for continuous post-deployment validation of these models, thereby ensuring the models remain effective and adapt to varying real-world scenarios and performance changes or drifts over time. Additionally, by allowing adaptive refinements to a model or the switch between different models based on real-world performance feedback, the described techniques ensure that the best-performing model is in use without disrupting the ongoing operations of the UE or the network. By aggregating performance feedback across multiple wireless devices, the methods enable more precise adjustments and improvements to the model.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device. The method includes communicating, with a second wireless device, one or more of a first indicator and a second indicator, the first indicator comprising a target performance for a performance criterion associated with a functionality of the second wireless device, and the second indicator comprising an expected performance for the performance criterion associated with the functionality; measuring a performance based on the functionality; and providing, for the second wireless device, feedback information indicating a measured performance associated with the functionality.

Aspect 2 is the method of aspect 1, wherein the functionality is associated with an artificial intelligence/machine learning (AI/ML) functionality or an AI/ML model.

Aspect 3 is the method of any of aspects 1 to 2, wherein the functionality includes one or more of: a channel state information (CSI) prediction, a CSI feedback compression, a CSI feedback reconstruction, or a beam prediction.

Aspect 4 is the method of any of aspects 1 to 2, wherein the performance criterion associated with the functionality comprises one or more of: an accuracy of the functionality, a loss value of the functionality, a throughput gain associated with the functionality, or a latency associated with the functionality.

Aspect 5 is the method of any of aspects 1 to 2, wherein the target performance comprises one or more of: a target average or a target k-percentile for the performance criterion associated with the functionality, or a target range for the target average or the target k-percentile.

Aspect 6 is the method of any of aspects 1 to 2, wherein the expected performance comprises one or more of: an expected average or an expected k-percentile for the performance criterion associated with the functionality, an expected range for the expected average or the expected k-percentile, a plurality of expected averages or expected k-percentiles respectively corresponding to a plurality of candidate AI/ML models or candidate functionalities, a plurality of expected ranges respectively corresponding to the plurality of expected averages or expected k-percentiles, or complexity information respectively corresponding to the plurality of candidate AI/ML models or candidate functionalities.

Aspect 7 is the method of aspect 6, wherein the second indicator further includes a flag indicating whether the target performance can be met.

Aspect 8 is the method of any of aspects 1 to 2, wherein communicating the one or more of the first indicator and the second indicator comprises: transmitting or receiving the one or more of the first indicator and the second indicator via one or more of: radio resource control (RRC) signaling, a medium access control (MAC)-control element (MAC-CE), or downlink control information (DCI).

Aspect 9 is the method of any of aspects 1 to 2, wherein communicating the one or more of the first indicator and the second indicator comprises: transmitting or receiving the first indicator; and receiving, from the second wireless device and based on the first indicator, the second indicator.

Aspect 10 is the method of aspect 9, wherein transmitting or receiving the first indicator comprises: receiving, from the second wireless device, the first indicator, or indicating, for the second wireless device, the first indicator.

Aspect 11 is the method of any of aspects 1 to 2, wherein the feedback information is comprised in one or more of uplink control information (UCI) or a radio resource control (RRC) message, and wherein the feedback information includes one or more of: a rating on the expected performance, an achieved average or an achieved k-percentile for the performance criterion associated with the functionality, a plurality of achieved averages of achieved k-percentiles respectively corresponding to a plurality of candidate AI/ML models or candidate functionalities, a plurality of achieved ranges respectively corresponding to the plurality of candidate AI/ML models or candidate functionalities, a first correction to an expected average or an expected k-percentile, a range correction to an expected range for the expected average or the expected k-percentile, a plurality of corrections respectively corresponding to a plurality of expected averages or a plurality of expected k-percentiles, or a plurality of range corrections respectively corresponding to a plurality of expected ranges.

Aspect 12 is the method of aspect 11, wherein the feedback information further comprises a flag indicating whether the expected performance is met.

Aspect 13 is an apparatus for wireless communication at a first wireless device, comprising: a processing system that includes processor circuitry and memory circuitry that stores code and is coupled with the processor circuitry, the processing system configured to cause the first wireless device to perform the method of one or more of aspects 1-12.

Aspect 14 is an apparatus for wireless communication at a first wireless device, comprising: at least one memory; and at least one processor coupled to the at least one memory and, where the at least one processor, individually or in any combination, is configured to perform the method of any of aspects 1-12.

Aspect 15 is the apparatus for wireless communication at a first wireless device, comprising means for performing each step in the method of any of aspects 1-12.

Aspect 16 is an apparatus of any of aspects 13-15, further comprising a transceiver configured to receive or to transmit in association with the method of any of aspects 1-12.

Aspect 17 is a computer-readable medium (e.g., a non-transitory computer-readable medium) storing computer executable code at a first wireless device, the code when executed by at least one processor causes the at least one processor to, individually or in any combination, perform the method of any of aspects 1-12.

Aspect 18 is a method of wireless communication at a target wireless device. The method includes communicate, with a first wireless device, one or more of a first indicator and a second indicator, the first indicator comprising a target performance for a performance criterion associated with a functionality of the target wireless device, and the second indicator comprising an expected performance for the performance criterion associated with the functionality; transmit wireless transmissions based on the functionality; and receive feedback information indicating a measured performance associated with the functionality that is measured by the first wireless device.

Aspect 19 is the method of aspect 18, wherein the functionality includes one or more of: a channel state information (CSI) prediction, a CSI feedback compression, a CSI feedback reconstruction, or a beam prediction, and wherein the performance criterion associated with the functionality comprises one or more of: an accuracy of the functionality, a loss value of the functionality, a throughput gain associated with the functionality, or a latency associated with the functionality.

Aspect 20 is the method of any of aspects 18 to 19, wherein the functionality is associated with an artificial intelligence/machine learning (AI/ML) functionality or an AI/ML model, and wherein the method further includes: selecting, based on the target performance, the AI/ML functionality or the AI/ML model from a plurality of candidate AI/ML functionalities or candidate AI/ML models, wherein the expected performance is associated with the AI/ML functionality or the AI/ML model, and the expected performance is better than the target performance.

Aspect 21 is the method of aspect 18, wherein the functionality is associated with an artificial intelligence/machine learning (AI/ML) functionality or an AI/ML model, wherein receiving the feedback information comprises: transmitting, for the first wireless device, a feedback request for the feedback information; and receiving the feedback information in response to the feedback request.

Aspect 22 is the method of aspect 21, wherein the feedback information is comprised in one or more of: uplink control information (UCI), or a radio resource control (RRC) message.

Aspect 23 is the method of aspect 18, wherein the functionality is associated with an artificial intelligence/machine learning (AI/ML) functionality or an AI/ML model, and wherein the method further includes adjusting, based on the feedback information, the second indicator, the AI/ML functionality, or the AI/ML model.

Aspect 24 is the method of aspect 23, wherein the method further includes: receiving, from a third wireless device, second feedback information indicating a second measured performance associated with the functionality measured on the third wireless device, and wherein adjusting the second indicator, the AI/ML functionality, or the AI/ML model comprises: adjusting, based on an aggregation of feedback from the first wireless device and the third wireless device, the second indicator, the AI/ML functionality, or the AI/ML model.

Aspect 25 is an apparatus for wireless communication at a target wireless device, comprising: a processing system that includes processor circuitry and memory circuitry that stores code and is coupled with the processor circuitry, the processing system configured to cause the network entity to perform the method of one or more of aspects 18-24.

Aspect 26 is an apparatus for wireless communication at a target wireless device, comprising: at least one memory; and at least one processor coupled to the at least one memory and, where the at least one processor, individually or in any combination, is configured to perform the method of any of aspects 18-24.

Aspect 27 is the apparatus for wireless communication at a target wireless device, comprising means for performing each step in the method of any of aspects 18-24.

Aspect 28 is an apparatus of any of aspects 25-27, further comprising a transceiver configured to receive or to transmit in association with the method of any of aspects 18-24.

Aspect 29 is a computer-readable medium (e.g., a non-transitory computer-readable medium) storing computer executable code at a target wireless device, the code when executed by at least one processor causes the at least one processor to, individually or in any combination, perform the method of any of aspects 18-24.

What is claimed is:

1. An apparatus for wireless communication at a first wireless device, comprising:

at least one memory; and at least one processor coupled to the at least one memory and, based at least in part on information stored in the at least one memory, the at least one processor, individually or in any combination, is configured to cause the first wireless device to:

communicate, with a second wireless device, one or more of a first indicator and a second indicator, the first indicator comprising a target performance for a performance criterion associated with a functionality of the second wireless device, and the second indicator comprising an expected performance for the performance criterion associated with the functionality;

measure a performance based on the functionality; and provide, for the second wireless device, feedback information indicating a measured performance associated with the functionality.

2. The apparatus of claim 1, further comprising a transceiver coupled to the at least one processor, wherein to communicate the one or more of the first indicator and the second indicator, the at least one processor, individually or in any combination, is configured to cause the first wireless device to communicate the one or more of the first indicator and the second indicator via the transceiver, and wherein the functionality is associated with an artificial intelligence/machine learning (AI/ML) functionality or an AI/ML model.

3. The apparatus of claim 2, wherein the functionality includes one or more of:

a channel state information (CSI) prediction, a CSI feedback compression, a CSI feedback reconstruction, or a beam prediction.

4. The apparatus of claim 2, wherein the performance criterion associated with the functionality comprises one or more of:

an accuracy of the functionality, a loss value of the functionality, a throughput gain associated with the functionality, or a latency associated with the functionality.

5. The apparatus of claim 2, wherein the target performance comprises one or more of:

a target average or a target k-percentile for the performance criterion associated with the functionality, or a target range for the target average or the target k-percentile.

6. The apparatus of claim 2, wherein the expected performance comprises one or more of:

an expected average or an expected k-percentile for the performance criterion associated with the functionality, an expected range for the expected average or the expected k-percentile, a plurality of expected averages or expected k-percentiles respectively corresponding to a plurality of candidate AI/ML models or candidate functionalities, a plurality of expected ranges respectively corresponding to the plurality of expected averages or the expected k-percentiles, or complexity information respectively corresponding to the plurality of candidate AI/ML models or the candidate functionalities.

7. The apparatus of claim 6, wherein the second indicator further includes a flag indicating whether the target performance can be met.

8. The apparatus of claim 2, wherein to communicate the one or more of the first indicator and the second indicator, the at least one processor, individually or in any combination, is configured to cause the first wireless device to:

transmit or receive the one or more of the first indicator and the second indicator via one or more of:

radio resource control (RRC) signaling, a medium access control (MAC)-control element (MAC-CE), or downlink control information (DCI).

9. The apparatus of claim 2, wherein to communicate the one or more of the first indicator and the second indicator, the at least one processor, individually or in any combination, is configured to cause the first wireless device to:

transmit or receive the first indicator; and receive, from the second wireless device and based on the first indicator, the second indicator.

10. The apparatus of claim 9, wherein to transmit or receive the first indicator, the at least one processor, individually or in any combination, is configured to cause the first wireless device to:

receive, from the second wireless device, the first indicator, or indicate, for the second wireless device, the first indicator.

11. The apparatus of claim 2, wherein the feedback information is comprised in one or more of uplink control information (UCI) or a radio resource control (RRC) message, and wherein the feedback information includes one or more of:

a rating on the expected performance, an achieved average or an achieved k-percentile for the performance criterion associated with the functionality, a plurality of achieved averages of achieved k-percentiles respectively corresponding to a plurality of candidate AI/ML models or candidate functionalities, a plurality of achieved ranges respectively corresponding to the plurality of candidate AI/ML models or the candidate functionalities, a first correction to an expected average or an expected k-percentile, a range correction to an expected range for the expected average or the expected k-percentile, a plurality of corrections respectively corresponding to a plurality of expected averages or a plurality of expected k-percentiles, or a plurality of range corrections respectively corresponding to a plurality of expected ranges.

12. The apparatus of claim 11, wherein the feedback information further comprises a flag indicating whether the expected performance is met.

13. An apparatus for wireless communication at a target wireless device, comprising:

at least one memory; and at least one processor coupled to the at least one memory and, based at least in part on information stored in the at least one memory, the at least one processor, individually or in any combination, is configured to cause the target wireless device to:

communicate, with a first wireless device, one or more of a first indicator and a second indicator, the first indicator comprising a target performance for a performance criterion associated with a functionality of the target wireless device, and the second indicator comprising an expected performance for the performance criterion associated with the functionality;

transmit wireless transmissions based on the functionality; and receive feedback information indicating a measured performance associated with the functionality that is measured by the first wireless device.

14. The apparatus of claim 13, further comprising a transceiver coupled to the at least one processor, wherein to communicate the one or more of the first indicator and the second indicator, the at least one processor, individually or in any combination, is configured to cause the target wireless device to communicate the one or more of the first indicator and the second indicator via the transceiver, and wherein the functionality includes one or more of:

a channel state information (CSI) prediction, a CSI feedback compression, a CSI feedback reconstruction, or a beam prediction, and wherein the performance criterion associated with the functionality comprises one or more of:

an accuracy of the functionality, a loss value of the functionality, a throughput gain associated with the functionality, or a latency associated with the functionality.

15. The apparatus of claim 13, wherein the functionality is associated with an artificial intelligence/machine learning (AI/ML) functionality or an AI/ML model, and wherein the at least one processor, individually or in any combination, is further configured to cause the target wireless device to:

select, based on the target performance, the AI/ML functionality or the AI/ML model from a plurality of candidate AI/ML functionalities or candidate AI/ML models, wherein the expected performance is associated with the AI/ML functionality or the AI/ML model, and the expected performance is better than the target performance.

16. The apparatus of claim 13, wherein the functionality is associated with an artificial intelligence/machine learning (AI/ML) functionality or an AI/ML model, wherein to receive the feedback information, the at least one processor, individually or in any combination, is configured to cause the target wireless device to:

transmit, for the first wireless device, a feedback request for the feedback information; and receive the feedback information in response to the feedback request.

17. The apparatus of claim 16, wherein the feedback information is comprised in one or more of:

uplink control information (UCI), or a radio resource control (RRC) message.

18. The apparatus of claim 13, wherein the functionality is associated with an artificial intelligence/machine learning (AI/ML) functionality or an AI/ML model, and wherein the at least one processor, individually or in any combination, is further configured to cause the target wireless device to:

adjust, based on the feedback information, the second indicator, the AI/ML functionality, or the AI/ML model.

19. The apparatus of claim 18, wherein the at least one processor, individually or in any combination, is further configured to cause the target wireless device to:

receive, from a third wireless device, second feedback information indicating a second measured performance associated with the functionality measured on the third wireless device, and wherein to adjust the second indicator, the AI/ML functionality, or the AI/ML model, the at least one processor, individually or in any combination, is configured to cause the target wireless device to:

adjust, based on an aggregation of feedback from the first wireless device and the third wireless device, the second indicator, the AI/ML functionality, or the AI/ML model.

20. A method of wireless communication at a first wireless device, comprising:

communicating, with a second wireless device, one or more of a first indicator and a second indicator, the first indicator comprising a target performance for a performance criterion associated with a functionality of the second wireless device, and the second indicator comprising an expected performance for the performance criterion associated with the functionality;

measuring a performance based on the functionality; and providing, for the second wireless device, feedback information indicating a measured performance associated with the functionality.

* * * * *